US012769424B2

(12) United States Patent
Kim et al.

(10) Patent No.: US 12,769,424 B2
(45) Date of Patent: Oct. 20, 2026

(54) TOUCH DISPLAY DEVICE AND TOUCH DRIVING METHOD

(71) Applicant: LG Display Co., Ltd., Seoul (KR)

(72) Inventors: Sangkyu Kim, Paju-si (KR); DeukSu Lee, Paju-si (KR); SungChul Kim, Paju-si (KR); SeungRok Shin, Paju-si (KR); Taeyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 153 days.

(21) Appl. No.: 18/676,278

(22) Filed: May 28, 2024

(65) Prior Publication Data

US 2025/0021189 A1 Jan. 16, 2025

(30) Foreign Application Priority Data

Jul. 13, 2023 (KR) ........................ 10-2023-0090793

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/04162* (2019.05);
(Continued)

(58) Field of Classification Search
CPC ......... G06F 2203/04114; G06F 3/0418; G06F 3/0412; G06F 3/04162; G06F 3/0441;
(Continued)

(56) References Cited

U.S. PATENT DOCUMENTS

| | | | |
|---|---|---|---|
| 9,128,561 B2 | 9/2015 | Lee et al. | |
| 10,241,597 B2 | 3/2019 | Jung et al. | |

(Continued)

FOREIGN PATENT DOCUMENTS

| | | | | |
|---|---|---|---|---|
| CN | 114495819 A | 5/2022 | | |
| GB | 2570212 A * | 7/2019 | ............ | G06F 3/044 |

(Continued)

OTHER PUBLICATIONS

WO-2016162215-A1, Koike Takeshi, Oct. 20, 2013 (English Translation).*

(Continued)

*Primary Examiner* — Ricardo Osorio
(74) *Attorney, Agent, or Firm* — Fenwick & West LLP

(57) ABSTRACT

A touch display device and a touch driving method are presented herein. The touch display device includes a display panel having a plurality of touch electrodes, a drive circuit configured to drive the display panel, a touch circuit configured to detect a position of a stylus relative to the display panel using a downlink signal transmitted from the stylus, and a timing controller configured to control the drive circuit and the touch circuit. During a blank period while operating in a global uplink mode, the touch circuit supplies a global uplink signal to an entirety of the display panel. During a display-driving period while operating in a local uplink mode, the touch circuit supplies a plurality of local uplink signals having different phases to a plurality of regions of the display panel.

20 Claims, 20 Drawing Sheets

(52) U.S. Cl.
CPC .......... *G06F 3/0441* (2019.05); *G06F 3/0446* (2019.05); *G06F 2203/04114* (2019.05)

(58) Field of Classification Search
CPC .. G06F 3/0446; G06F 3/04166; G06F 3/0442; G06F 3/0443; G06F 2203/04111; G06F 2203/04112; G06F 3/04164; G06F 3/047
See application file for complete search history.

(56) References Cited

U.S. PATENT DOCUMENTS

| | | | | |
|---|---|---|---|---|
| 10,423,273 | B2 | 9/2019 | Leigh et al. | |
| 10,620,737 | B2 | 4/2020 | Leigh et al. | |
| 10,739,909 | B1 * | 8/2020 | Lin | G09G 5/003 |
| 11,360,601 | B2 * | 6/2022 | Kim | G06F 3/0412 |
| 11,435,859 | B2 * | 9/2022 | Haran | G06F 3/041661 |
| 11,656,715 | B2 | 5/2023 | Cho et al. | |
| 11,797,129 | B2 * | 10/2023 | Lim | G06F 3/03545 |
| 12,032,773 | B2 | 7/2024 | Cho et al. | |
| 12,135,851 | B2 * | 11/2024 | Miyamoto | G06F 3/0383 |
| 12,307,027 | B2 * | 5/2025 | Cheng | G06F 3/03545 |
| 12,443,313 | B2 * | 10/2025 | Mo | G06F 3/04162 |
| 12,481,393 | B2 * | 11/2025 | Lee | G06F 3/04166 |
| 2016/0188085 | A1 | 6/2016 | Leigh et al. | |
| 2017/0285771 | A1 | 10/2017 | Jung et al. | |
| 2018/0095592 | A1 | 4/2018 | Leigh et al. | |
| 2018/0164909 | A1 | 6/2018 | Bae et al. | |
| 2019/0171320 | A1 | 6/2019 | Kim et al. | |
| 2019/0179475 | A1 * | 6/2019 | Seo | G06F 3/0442 |
| 2019/0204939 | A1 * | 7/2019 | Ju | G06F 3/04162 |
| 2020/0241688 | A1 | 7/2020 | Leigh et al. | |
| 2020/0264726 | A1 * | 8/2020 | Kim | G06F 3/0445 |
| 2022/0052124 | A1 | 2/2022 | Kim et al. | |
| 2022/0129129 | A1 * | 4/2022 | Lim | G06F 3/04162 |
| 2022/0214791 | A1 | 7/2022 | Cho et al. | |
| 2022/0326805 | A1 * | 10/2022 | Lin | G06F 3/03545 |
| 2023/0140181 | A1 * | 5/2023 | Cheng | G06F 3/03545 345/174 |
| 2023/0266842 | A1 | 8/2023 | Cho et al. | |

FOREIGN PATENT DOCUMENTS

| | | | | |
|---|---|---|---|---|
| JP | 2018-502382 | A | 1/2018 | |
| KR | 10-2017-0090968 | A | 8/2017 | |
| KR | 10-2022-0099031 | A | 7/2022 | |
| TW | 202309727 | A | 3/2023 | |
| WO | WO-2016163315 | A1 * | 10/2016 | G06F 3/03 |

OTHER PUBLICATIONS

Japan Patent Office, Notice of Allowance, Japanese Patent Application No. 2024-109314, Jan. 27, 2025, five pages.
Taiwan Intellectual Property Office, Office Action, Taiwanese Patent Application No. 113126308, Sep. 17, 2025, 31 pages.
Intellectual Property India, Office Action, Indian Patent Application No. 202414051283, Jul. 10, 2026, eight pages.

* cited by examiner

TOUCH DISPLAY DEVICE AND TOUCH DRIVING METHOD

CROSS-REFERENCE TO RELATED APPLICATION

This application claims the priority from Republic of Korea Patent Application No. 10-2023-0090793 filed on Jul. 13, 2023, which is hereby incorporated by reference in its entirety.

BACKGROUND

Field

Embodiments of the disclosure relate to a touch display device and a touch driving method and, more specifically, to a touch display device and a touch driving method capable of reducing image quality degradation caused by an uplink signal transmitted to a stylus.

Description of Related Art

With the development of the information society, the demand for display devices for displaying images is increasing in various forms. Various display devices are utilized, such as liquid crystal displays, electroluminescent displays, or quantum dot light-emitting displays.

In order to provide a wider range of functions, these display devices provide functions that recognize a user's finger touch or pen touch on a display panel and perform input processing based on the recognized touch.

In an example, a touch display device capable of recognizing touch may include a plurality of touch electrodes disposed on or embedded in a display panel, and may drive the touch electrodes to detect the presence of a user's touch on the display panel and the coordinates of the touch.

Such touch display devices are increasingly being used not only in mobile devices such as smartphones and tablet PCs, but also in large-screen touch display devices such as automotive displays and exhibition displays.

In this case, touch functionality on touch display devices may utilize not only a passive stylus, such as a finger, but also an active stylus that may transmit and receive signals to and from a display panel.

On the other hand, as touch display devices are becoming lighter and thinner, the touch electrodes and data lines located on the display panel are being spaced closer together.

As a result, in the process of transmitting an uplink signal from the display panel to the active stylus for communication with the active stylus, the uplink signal may cause noise in the data voltage, which may deteriorate the image quality of the image displayed on the display panel.

SUMMARY

Accordingly, the present disclosure discloses a touch display device and a touch driving method capable of reducing image quality degradation caused by an uplink signal transmitted to an active stylus.

Embodiments of the present disclosure may provide a touch display device and touch driving method in which a global uplink mode is performed during a blank period and a local uplink mode is performed during a display-driving period, thereby minimizing or at least reducing deviations in data voltages caused by uplink signals.

Further, embodiments of the present disclosure may provide a touch display device and touch driving method in which in a local uplink mode, a touch-driving signal with a first phase is applied to a first local region where an active stylus is located, and a touch-driving signal with a second phase is applied to a second local region adjacent to the first local region, thereby compensating for deviations in data voltages caused by the touch-driving signals.

Embodiments of the present disclosure may provide a touch display device including: a display panel having a plurality of touch electrodes; a drive circuit configured to drive the display panel; a touch circuit configured to detect a position of a stylus relative to the display panel using a downlink signal transmitted from the stylus, supply, during a blank period while operating in a global uplink mode, a global uplink signal to an entirety of the display panel, and supply, during a display-driving period while operating in a local uplink mode, a plurality of local uplink signals having different phases to a plurality of regions of the display panel; and a timing controller configured to control the drive circuit and the touch circuit.

Embodiments of the present disclosure may provide a method of driving a touch display device to detect a position of a stylus relative to a display panel of the touch display device, the method including: supplying, by a touch circuit of the touch display device during a blank period while the touch circuit operates in a global uplink mode, a global uplink signal to an entirety of the display panel; determining, by the touch circuit, the position of the stylus using a downlink signal transmitted from the stylus in response to the global uplink signal; and supplying, by the touch circuit during a display-driving period while the touch circuit operates in a local uplink mode, a plurality of local uplink signals having different phases to a plurality of regions.

Embodiments of the present disclosure may provide a touch display device including: a display panel having a plurality of touch electrodes; a drive circuit configured to drive the display panel; a touch circuit configured to supply, during a blank period, a global uplink signal to an entirety of the display panel, sense a presence of a touch object based on a downlink signal transmitted from the touch object in response to the global uplink signal, and supply, during a display-driving period, a first local uplink signal having a first phase to a first region of the display panel at which the presence of the touch object is sensed, and a second local uplink signal to a second region of the display panel while the first local uplink signal is supplied to the first region, the second local uplink signal having a second phase that is different from the first phase; and a timing controller configured to control the drive circuit and the touch circuit.

Embodiments of the present disclosure have the effect of reducing image quality deterioration caused by uplink signals transmitted to the active stylus and enabling the manufacture of lightweight touch display devices.

Furthermore, embodiments of the present disclosure have the effect of minimizing or at least reducing deviations in data voltages caused by uplink signals by operating in the global uplink mode during the blank period and in the local uplink mode during the display-driving period.

Furthermore, embodiments of the present disclosure have the effect of compensating for deviations in data voltages caused by touch-driving signals by, in the local uplink mode, applying the touch-driving signal with the first phase to the first local region where the active stylus is located and applying the touch-driving signal with the second phase to the second local region adjacent to the first local region.

DETAILED DESCRIPTION

Figure 1:
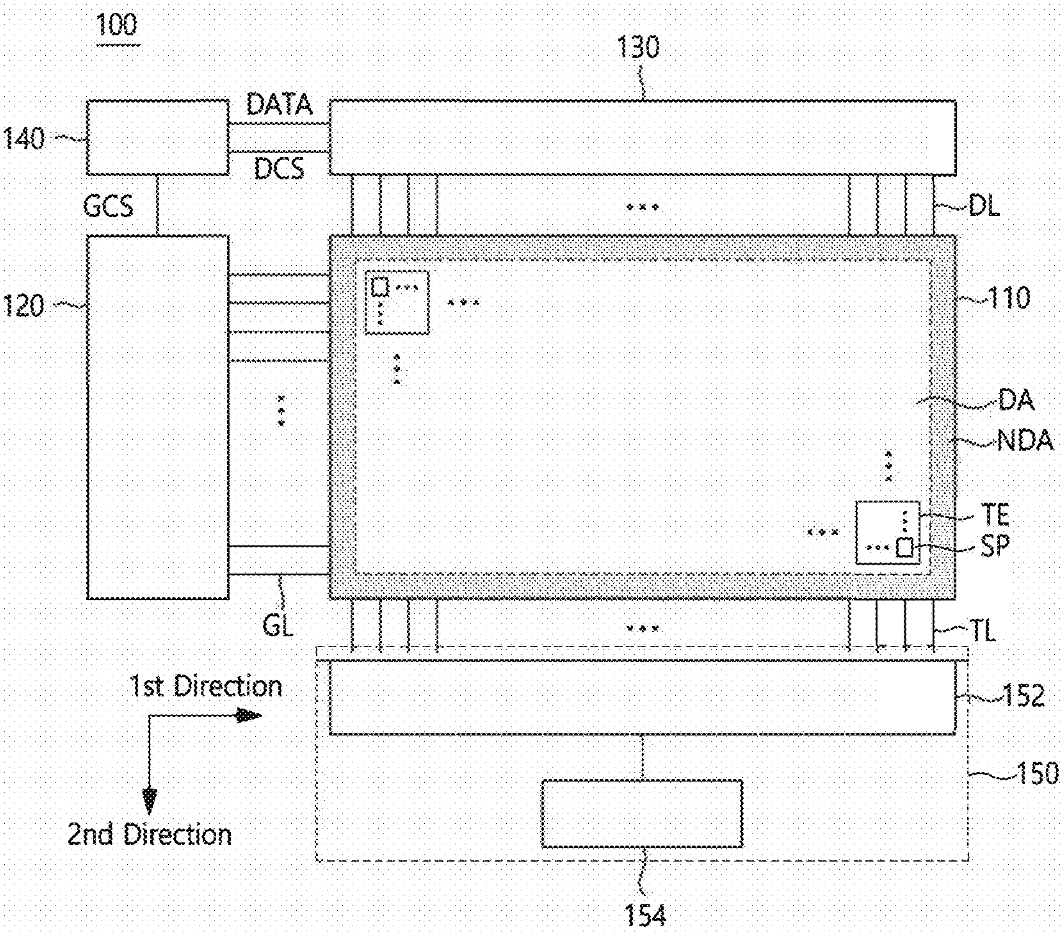
FIG. 1 is a diagram illustrating a schematic configuration of a touch display device according to embodiments of the present disclosure.

Hereinafter, some embodiments of the present disclosure will be described in detail with reference to exemplary drawings. In the following description of examples or embodiments of the present disclosure, reference will be made to the accompanying drawings in which it is shown by way of illustration specific examples or embodiments that may be implemented, and in which the same reference numerals and signs may be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "comprising," "constituting," "make up of" and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)" or "(B)" may be used herein to describe elements of the present disclosure. Each of these terms is not used to define essence, order, sequence, number of elements, etc., but is used merely to distinguish the corresponding element from other elements.

When it is mentioned that a first element "is connected or coupled to," "contacts or overlaps," etc. a second element, it should be interpreted that, not only may the first element "be directly connected or coupled to" or "directly contact or overlap" the second element, but a third element may also be "interposed" between the first and second elements, or the first and second elements may "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before" and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to accompanying drawings.

FIG. 1 is a diagram illustrating a schematic configuration of a touch display device according to embodiments of the present disclosure.

Referring to FIG. 1, the touch display device 100 according to embodiments of the present disclosure may include a display panel 110, a data drive circuit 130, a gate drive circuit 120, and a timing controller 140 as components for displaying an image.

The display panel 110 may include a display area DA in which an image is displayed and a non-display area NDA in which an image is not displayed.

The non-display area NDA may be a peripheral area of the display area DA, which may also be referred to as a bezel area. The non-display area NDA may be a region that is visible from the front of the touch display device 100, or it may be a region that is curved and not visible from the front of the touch display device 100.

The display panel 110 may include a plurality of subpixels SPs. For example, the touch display device 100 may be various types of display devices, including a liquid crystal display device, an organic light-emitting display device, a micro light-emitting diode (micro-LED) display device, a quantum dot display device, and the like.

Depending on the type of the touch display device 100, the structure of each of the plurality of subpixels SPs may vary. For example, if the touch display device 100 is a self-illuminating display device in which the subpixels SPs are self-illuminating, each subpixel SP may include a self-illuminating light-emitting element, one or more transistors, and one or more capacitors.

In addition, the display panel 110 may further include several different types of signal lines to drive the multiple subpixels SPs. For example, the various types of signal lines may include a plurality of data lines DL carrying data signals (also referred to as data voltages or image data), a plurality of gate lines GL carrying gate signals (also referred to as scan signals), and the like.

The plurality of data lines DL and the plurality of gate lines GL may intersect each other. Each of the plurality of gate lines GL may be disposed extending in a first direction corresponding to a row direction. Each of the plurality of data lines DL may be disposed extending in a second direction corresponding to a column direction.

Here, the first direction and the second direction are relative. For example, the first direction may be a horizontal direction and the second direction may be a vertical direction. In another example, the first direction may be a vertical direction and the second direction may be a horizontal direction.

The data drive circuit 130 is a circuit for driving a plurality of data lines DL, and may output data signals to the plurality of data lines DL. The gate drive circuit 120 is a circuit for driving a plurality of gate lines GL, and may output gate signals to the plurality of gate lines GL The timing controller 140 is a device for controlling the data drive circuit 130 and the gate drive circuit 120, and may control the drive timing for the plurality of data lines DL and the drive timing for the plurality of gate lines GL.

The timing controller 140 may supply various types of data drive control signals DCS to the data drive circuit 130 to control the data drive circuit 130, and various types of gate drive control signals GCSs to the gate drive circuit 120 to control the gate drive circuit 120.

The data drive circuit 130 may supply data signals to a plurality of data lines DL according to the drive timing control of the timing controller 140. The data drive circuit 130 may receive image data DATA in digital form from the timing controller 140, and may convert the received image data DATA into data signals in analog form and output them to the plurality of data lines DL.

The gate drive circuit 120 may supply gate signals to a plurality of gate lines GL according to the timing control of the timing controller 140. The gate drive circuit 120 may be supplied with a first gate voltage corresponding to a turn-on level voltage and a second gate voltage corresponding to a turn-off level voltage along with various gate drive control signals GCSs to generate a gate signal, and may supply the generated gate signal to the plurality of gate lines GL. Here, the turn-on level voltage may be a high-level voltage and the turn-off level voltage may be a low-level voltage. Conversely, the turn-on level voltage may be a low-level voltage and the turn-off level voltage may be a high-level voltage.

The touch display device 100 may include a touch screen panel, and a touch circuit 150 that senses the touch screen panel to detect whether a touch has been made by a touch object, such as a finger or a pen, or to detect a touch position, in order to further provide a touch sensing function in addition to an image display function.

The touch circuit 150 may include a touch drive circuit 152 that drives and senses the touch screen panel to generate and output touch sensing data, a touch controller 154 that may use the touch sensing data to detect a touch occurrence or a touch position, and the like.

The touch screen panel may include a plurality of touch electrodes TE as touch sensors. The touch screen panel may further include a plurality of touch lines TL for electrically connecting the plurality of touch electrodes TE to the touch drive circuit 152. The touch screen panel or touch electrodes TE are also referred to as touch sensors.

The touch screen panel may be external to the display panel 110 or may be internal to the display panel 110. When the touch screen panel is external to the display panel 110, it is referred to as an external touch screen panel. If the touch screen panel is an external touch screen panel, the touch screen panel and the display panel 110 may be fabricated separately and assembled. The external touch screen panel may include a substrate, a plurality of touch electrodes TE on the substrate, and the like.

If the touch screen panel is present inside the display panel 110, it is referred to as an embedded touch screen panel. In the case of an embedded touch screen panel, the touch screen panel may be formed within the display panel 110 during the fabrication process of the display panel 110.

The touch drive circuit 152 may supply a touch-driving signal to at least one of the plurality of touch electrodes TE, and may detect a touch sensing signal transmitted from the at least one touch electrode TE of the plurality of touch electrodes TE to generate touch sensing data.

The touch circuit 150 may perform touch sensing in a self-capacitance manner or a mutual-capacitance manner.

If the touch circuit 150 performs the touch sensing in the self-capacitance manner, the touch circuit 150 may perform the touch sensing based on the capacitance between each touch electrode TE and a touch object (e.g., finger, pen, etc.).

If the touch circuit 150 performs the touch sensing in the mutual-capacitance manner, the touch circuit 150 may perform the touch sensing based on the capacitance between the touch electrodes TE.

According to the mutual-capacitance manner, the plurality of touch electrodes TE are divided into touch-driving electrodes and touch-sensing electrodes. The touch drive circuit 152 may drive the touch drive electrode using the touch-driving signal and detect the touch sensing signal from the touch sensing electrode.

According to the self-capacitance manner, each of the plurality of touch electrodes TE may act as a touch drive electrode as well as a touch sensing electrode. The touch drive circuit 152 may drive all or some of the plurality of touch electrodes TE and may sense all or some of the plurality of touch electrodes TE.

The touch drive circuit 152 and the touch controller 154 may be implemented as separate devices, or may be implemented as a single device.

Alternatively, the touch drive circuit 152 and the data drive circuit 130 may be implemented as separate integrated circuits. Alternatively, all or a portion of the touch drive circuit 152 and all or a portion of the data drive circuit 130 may be integrated with each other and implemented as a single integrated circuit.

The touch display device 100 according to embodiments of the present disclosure may be a self-illuminating display device, such as an organic light-emitting display device, a quantum dot display device, a micro-LED display device, or the like, in which a self-illuminating light-emitting element is disposed on the display panel 110.

Figure 2:
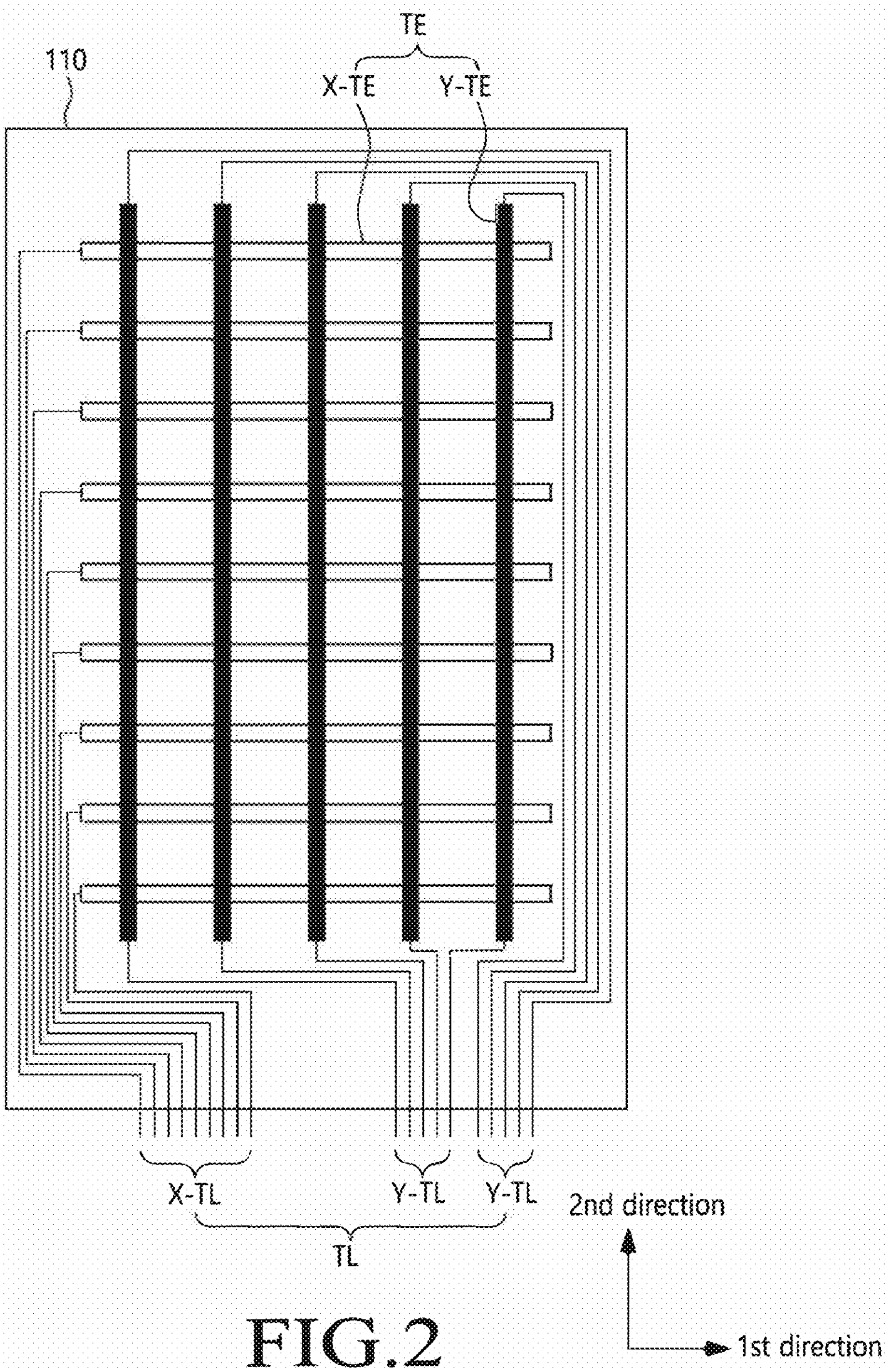
FIG. 2 is a diagram illustrating a schematic configuration of a mutual capacitance-based touch electrode structure in a touch display device according to embodiments of the present disclosure.

FIG. 2 is a diagram schematically illustrating a mutual capacitance-based touch electrode structure in the touch display device according to embodiments of the present disclosure.

Referring to FIG. 2, in the touch display device 100 according to embodiments of the present disclosure, the mutual capacitance-based touch electrode structure may include a plurality of X-touch electrodes X-TE and a plurality of Y-touch electrodes Y-TE formed on a display panel 110. Here, the plurality of X-touch electrodes X-TE and the plurality of Y-touch electrodes Y-TE may be located on top of an encapsulation layer.

Each of the plurality of X-touch electrodes X-TE may be disposed in a first direction, and each of the plurality of Y-touch electrodes Y-TE may be disposed in a second direction different from the first direction.

In the present disclosure, the first direction and the second direction may be relatively different directions, for example, the first direction may be an x-axis direction and the second direction may be a y-axis direction. Conversely, the first direction may be a y-axis direction and the second direction may be an x-axis direction. Further, the first direction and the second direction may or may not be orthogonal to each other. Further, as described herein, rows and columns are relative, and the rows and columns may be interchanged depending on the viewing perspective.

Each of the plurality of X-touch electrodes X-TE may include a plurality of electrically connected X-touch electrode sections. Each of the plurality of Y-touch electrodes Y-TE may include a plurality of electrically connected Y-touch electrode sections.

Here, the plurality of X-touch electrodes X-TE and the plurality of Y-touch electrodes Y-TE are electrodes that are included in the plurality of touch electrodes TE and have distinct roles (functions). For example, the plurality of X-touch electrodes X-TE may be touch-driving electrodes and the plurality of Y-touch electrodes Y-TE may be touch-sensing electrodes. Conversely, the plurality of X-touch electrodes X-TE may be touch-sensing electrodes and the plurality of Y-touch electrodes Y-TE may be touch-driving electrodes.

The plurality of touch lines TL may include one or more X-touch lines X-TL connected to each of the plurality of X-touch electrodes X-TE, and one or more Y-touch lines Y-TL connected to each of the plurality of Y-touch electrodes Y-TE.

The touch circuit 150 may supply touch-driving signals to the X-touch electrodes X-TE via the X-touch lines X-TL and receive touch sensing signals generated by the Y-touch electrodes Y-TE via the Y-touch lines Y-TL.

Figure 3:
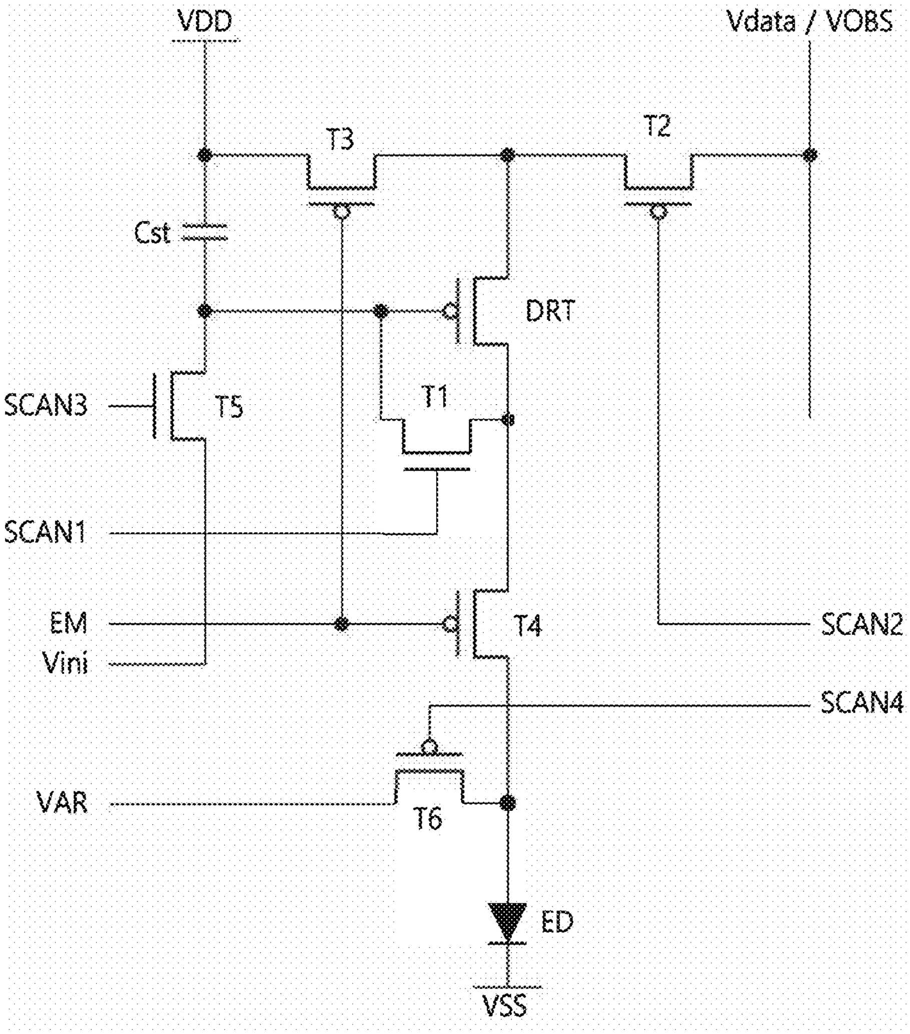
FIG. 3 is a diagram illustrating an example of a subpixel circuit of a touch display device according to embodiments of the present disclosure.

FIG. 3 is a diagram illustrating a subpixel circuit of a touch display device according to embodiments of the present disclosure.

Referring to FIG. 3, a subpixel SP of a touch display device 100 according to embodiments of the present disclosure includes first to sixth switching transistors T1 to T6, a drive transistor DRT, a storage capacitor Cst, and a light-emitting diode ED.

Here, the light-emitting diode ED may be a self-illuminating light-emitting diode such as an organic light-emitting diode (OLED), for example.

In the subpixel SP according to embodiments of the present disclosure, the second to fourth switching transistors T2 to T4, the sixth switching transistor T6, and the drive transistor DRT may be P-type transistors. Further, the first switching transistor T1 and the fifth switching transistor T5 may be N-type transistors.

P-type transistors are relatively more reliable than N-type transistors. In the case of a P-type transistor, since the source electrode may be fixed with a high-potential drive voltage VDD during light emission, it is advantageous that the current flowing through the light-emitting diode ED is not swayed by the capacitor Cst. Therefore, it is easy to supply a steady current.

Since the P-type transistor is connected to an anode electrode of the light-emitting diode ED, when operating in the saturation region, the P-type transistor may deliver a constant current regardless of changes in the threshold voltage, so they are relatively reliable.

In such a subpixel SP structure, the N-type transistors T1 and T5 may be made of oxide transistors formed using oxide semiconductors (e.g., transistors with channels formed from oxide semiconductors such as indium, gallium, zinc oxide or IGZO), and the other P-type transistors DRT, T2 to T4, and T6 may be silicon transistors formed from a semiconductor such as silicon (e.g., transistors having polysilicon channels formed using a low temperature process referred to as LTPS or low temperature polysilicon).

Since oxide transistors are characterized by relatively lower leakage current than silicon transistors, implementing the transistor using oxide transistor has the effect of preventing current leakage from the gate electrode of the drive transistor DRT, thereby reducing image quality defects such as flicker.

On the other hand, except for the first switching transistor T1 and the fifth switching transistor T5, which correspond to N-type transistors, the remaining P-type transistors DRT, T2 to T4, and T6 may be made of low-temperature polysilicon.

The source electrode and drain electrode of the switching transistor described below may be referred to as drain electrode and source electrode, respectively, depending on the input voltage.

The gate electrode of the first switching transistor T1 is supplied with a first scan signal SCAN1. The drain electrode of the first switching transistor T1 is connected to the gate electrode of the drive transistor DRT.

The source electrode of the first switching transistor T1 is connected to the drain electrode of the drive transistor DRT.

The first switching transistor T1 is turned on by the first scan signal SCAN1 to keep the gate voltage of the drive transistor DRT constant by the storage capacitor Cst, whose first terminal is fixed to the high-voltage drive voltage VDD.

The first switching transistor T1 may include an N-type MOS transistor to form an oxide transistor. Since N-type MOS transistors use electrons rather than holes as carriers, the N-type MOS transistors have faster mobility compared to P-type MOS transistors, and thus may have a faster switching speed.

The gate electrode of the second switching transistor T2 is supplied with a second scan signal SCAN2. The source electrode of the second switching transistor T2 may be supplied with a data voltage Vdata or a bias voltage VOBS. The drain electrode of the second switching transistor T2 is connected to the source electrode of the drive transistor DRT.

The second switching transistor T2 is turned on by the second scan signal SCAN2 to supply a data voltage Vdata to the source electrode of the drive transistor DRT.

The gate electrode of the third switching transistor T3 is supplied with an emission signal EM. The source electrode of the third switching transistor T3 is supplied with a high-voltage drive voltage VDD. The drain electrode of the third switching transistor T3 is connected to the source electrode of the drive transistor DRT.

The third switching transistor T3 is turned on by the emission signal EM to supply a high-potential drive voltage VDD to the source electrode of the drive transistor DRT.

The gate electrode of the fourth switching transistor T4 is supplied with the emission signal EM. The source electrode of the fourth switching transistor T4 is connected to the drain electrode of the drive transistor DRT. The drain electrode of the fourth switching transistor T4 is connected to the anode electrode of the light-emitting diode ED.

The fourth switching transistor T4 is turned on by the emission signal EM to supply a drive current to the anode electrode of the light-emitting diode ED.

The gate electrode of the fifth switching transistor T5 is supplied with a third scan signal SCAN3.

Here, the third scan signal SCAN3 may be a first scan signal SCAN1 supplied to a subpixel SP at a different location. For example, if the first scan signal SCAN1 is applied to the nth gate line, the third scan signal SCAN3 may utilize a first scan signal SCAN1 [n-1] applied to the n-$1^{st}$ gate line. Alternatively, the first scan signal SCAN1 [n-2] applied to the n-$2^{nd}$ gate line or the first scan signal SCAN1 [n-3] applied to the n-$3^{rd}$ gate line may be utilized as the third scan signal SCAN3. In other words, the third scan signal SCAN3 may utilize the first scan signal SCAN1 to vary the gate line GL depending on the phase in which the display panel 110 is driven.

The drain electrode of the fifth switching transistor T5 is supplied with a stabilization voltage Vini. The source electrode of the fifth switching transistor T5 is connected to the gate electrode of the drive transistor DRT and the storage capacitor Cst.

The fifth switching transistor T5 is turned on by the third scan signal SCAN3 to supply a stabilization voltage Vini to the gate electrode of the drive transistor DRT.

The gate electrode of the sixth switching transistor T6 is supplied with a fourth scan signal SCAN4.

Here, the fourth scan signal SCAN4 may be a second scan signal SCAN2 supplied to a subpixel SP at a different location. For example, if the second scan signal SCAN2 is applied to the nth gate line GL, the fourth scan signal SCAN4 may be a second scan signal SCAN2 applied to the n-$1^{st}$ gate line GL. In other words, the fourth scan signal SCAN4 may utilize the second scan signal SCAN2 to vary the gate line GL depending on the phase in which the display panel 110 is driven.

The source electrode of the sixth switching transistor T6 is supplied with a reset voltage VAR. The drain electrode of the sixth switching transistor T6 is connected to the anode electrode of the light-emitting diode ED.

The sixth switching transistor T6 is turned on by the fourth scan signal SCAN4 to supply a reset voltage VAR to the anode electrode of the light-emitting diode ED.

The gate electrode of the drive transistor DRT is connected to the drain electrode of the first switching transistor T1. The source electrode of the drive transistor DRT is connected to the drain electrode of the second switching transistor T2.

The drive transistor DRT is turned on by a voltage difference between the gate electrode and the source electrode, causing a drive current to be applied to the light-emitting diode ED.

The source electrode and the drain electrode of the first switching transistor T1 are connected to the drain electrode and the gate electrode of the drive transistor DRT, respectively, and an operation of sampling and compensating for the threshold voltage of the drive transistor DRT may be performed by a data voltage Vdata applied to the source electrode of the drive transistor DRT while the first switching transistor T1 is turned on.

The first electrode of the storage capacitor Cst is applied with a high-potential drive voltage VDD, and the second electrode of the storage capacitor is connected to the gate electrode of the drive transistor DRT. The storage capacitor Cst stores the voltage of the gate electrode of the drive transistor DRT.

The anode electrode of the light-emitting diode ED is connected with the drain electrode of the fourth switching transistor T4 and the drain electrode of the sixth switching transistor T6. A low-potential drive voltage VSS is applied to the cathode electrode of the light-emitting diode ED.

The light-emitting diode ED emits light at a predetermined brightness by the drive current flowing through the drive transistor DRT.

At this time, a stabilization voltage Vini is supplied to stabilize the change in capacitance formed on the gate electrode of the drive transistor DRT, and a reset voltage VAR is supplied to reset the anode electrode of the light-emitting diode ED.

When the reset voltage VAR is supplied to the anode electrode of the light-emitting diode ED with the fourth switching transistor T4 turned off, which is located between the anode electrode of the light-emitting diode ED and the drive transistor DRT and is controlled by the emission signal EM the anode electrode of the light-emitting diode ED may be reset.

The sixth switching transistor T6 supplying the reset voltage VAR is connected with the anode electrode of the light-emitting diode ED.

The third scan signal SCAN3 for driving the drive transistor DRT or initializing the drive transistor DRT and the fourth scan signal SCAN4 for controlling the supply of the reset voltage VAR to the anode electrode of the light-emitting diode ED are separated from each other so that the operation of driving the drive transistor DRT and the operation of resetting the anode electrode of the light-emitting diode ED may be performed separately.

At this time, a subpixel SP may be configured so that when the switching transistors T5 and T6 supplying the stabilization voltage Vini and the reset voltage VAR are turned on, the fourth switching transistor T4 connecting the drain electrode of the drive transistor DRT and the anode electrode of the light-emitting diode ED is turned off to block the drive current of the drive transistor DRT from flowing to the anode electrode of the light-emitting diode ED, and the anode electrode is not affected by any voltage other than the reset voltage VAR.

As such, a subpixel SP consisting of seven transistors DRT, T1, T2, T3, T4, T5, and T6 and one storage capacitor Cst may be referred to as a 7T1C structure.

The 7T1C structure is shown here as an example of a subpixel SP circuit of various structures, and the structure and number of transistors and capacitors configuring the subpixel SP may be varied. Each of the plurality of subpixels SPs may have the same structure, or some of the plurality of subpixels SPs may have different structures.

The touch display device 100 according to embodiments of the present disclosure may divide a one-frame period into one or more display-driving periods and one or more touch-driving periods, and may alternate between display-driving operations and touch-driving operations.

In the case of sensing a user's finger touch, it may be effective to alternate the display-driving operation and the touch-driving operation.

Alternatively, the touch display device 100 according to embodiments of the present disclosure may proceed with the touch-driving period independently of the display-driving period. In particular, in the case of an active stylus that may transmit and receive signals to and from the display panel 110, it may be effective to proceed with the touch-driving period independently of the display-driving period.

Figure 4:
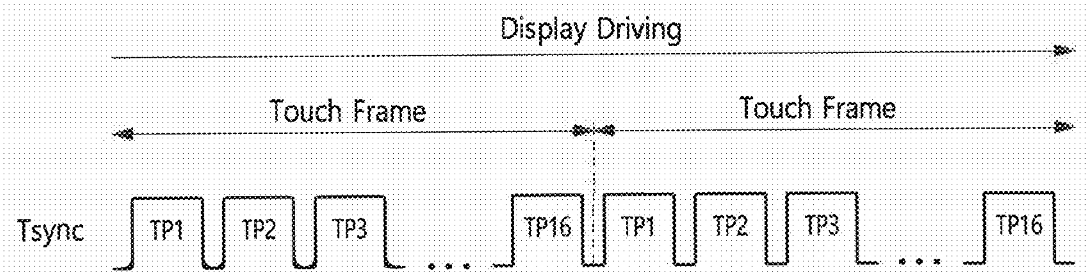
FIG. 4 is a diagram illustrating an example of a touch-driving period independent of a display-driving period in a touch display device according to embodiments of the present disclosure.

FIG. 4 is a diagram illustrating an example of proceeding with a touch-driving period independent of a display-driving period in a touch display device according to embodiments of the present disclosure.

Referring to FIG. 4, the touch display device 100 according to embodiments of the present disclosure may perform the display-driving operation and the touch-driving operation at different time periods, but the display-driving operation and the touch-driving operation may also be performed simultaneously.

Accordingly, a touch synchronization signal Tsync may serve to distinguish between a display-driving period DP and a touch-driving period TP, or it may identify and indicate only a touch-driving period TP.

For example, 16 touch-driving periods TP1 to TP16 may be one touch frame period. Here, the touch frame period may mean a period of time during which a touch by a stylus may be sensed once across the entire screen area.

While it is exemplified here that the touch-driving operation is performed in a high-level section of the touch synchronization signal Tsync, the touch-driving operation may also be performed in a low-level section of the touch synchronization signal Tsync. The display-driving and touch-driving operations may occur simultaneously or in a time-division manner.

In some of the touch-driving periods TP1 to TP16 constituting a touch frame, a finger touch-driving operation may be performed to sense a finger touch, and in some of the other periods, a pen touch-driving operation may be performed to sense a stylus touch.

Figure 5:
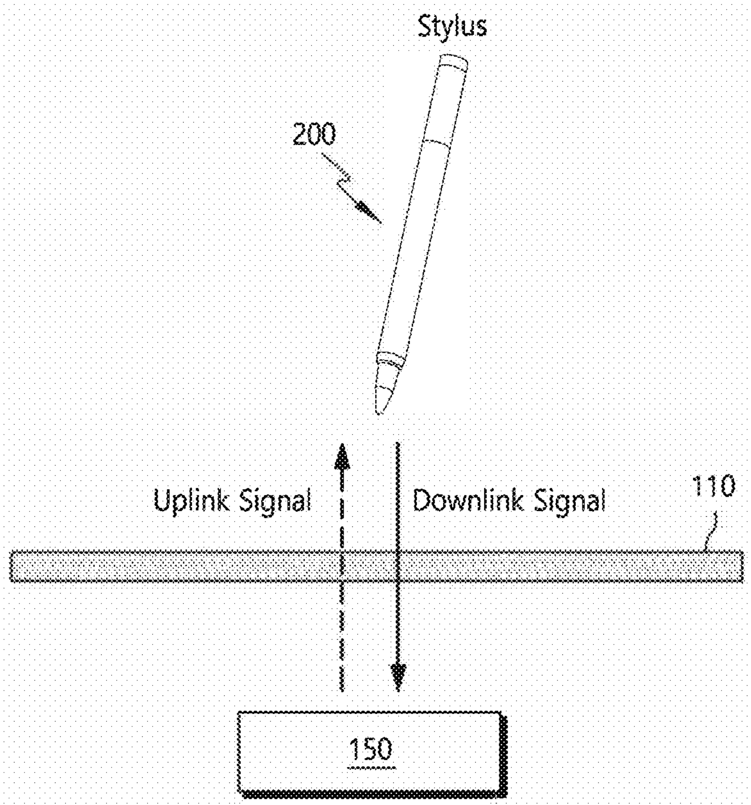
FIG. 5 is a diagram illustrating an operation between a touch display device and a stylus according to embodiments of the present disclosure.

FIG. 5 is a diagram illustrating an example operation between a touch display device and a stylus according to embodiments of the present disclosure.

Referring to FIG. 5, the touch display device 100 according to embodiments of the present disclosure may, during a touch-driving period for sensing a stylus touch, transmit, to a stylus 200, an uplink signal including various information for controlling the driving of the stylus 200 or various information necessary for the driving of the stylus 200, via a transmission circuit.

More specifically, the touch circuit 150 supplies the uplink signal to one or more of a plurality of touch electrodes TE included in the display panel 110.

Accordingly, the stylus 200 adjacent to the display panel 110 may receive the uplink signal via a stylus tip. That is, the stylus 200 may receive the uplink signal via one or more of the plurality of touch electrodes TE included in the display panel 110.

In response to the uplink signal transmitted from the touch display device 100, the stylus 200 outputs a downlink signal indicating a position, tilt, or various additional information of the stylus 200.

The downlink signal output from the stylus 200 may be applied to the touch electrode TE of the display panel 110.

The touch circuit 150 of the touch display device 100 may receive the downlink signal output from the stylus 200 via the touch electrode TE, and may acquire the position, tilt, and various additional information of the stylus 200 based on the received downlink signal.

Here, the uplink signal may include, for example, a beacon signal or a ping signal.

The beacon signal is a control signal for the touch display device 100 to control the driving of the stylus 200 or to inform the stylus 200 of necessary information, and may include various information necessary for the driving of the stylus 200.

For example, the beacon signal may include one or more of basic information of the display panel 110 (e.g., status information, identification information, in-cell type, etc.), information about the driving mode of the display panel 110 (e.g., mode identification information about display mode, stylus search mode, etc.), information about the characteristics of the downlink signal (e.g., frequency, pulse count, etc.), information about drive timing, information about driving of multiplexer, information about power mode (e.g., operation mode for lower power consumption, etc.), and may further include information for synchronization between the display panel 110 and the stylus 200.

The ping signal may be a control signal for synchronization of the downlink signal.

Additional information that may be included in the downlink signal may include one or more of, for example, pressure, stylus ID, button information, battery information, and information for checking and correcting information errors.

Figure 6:
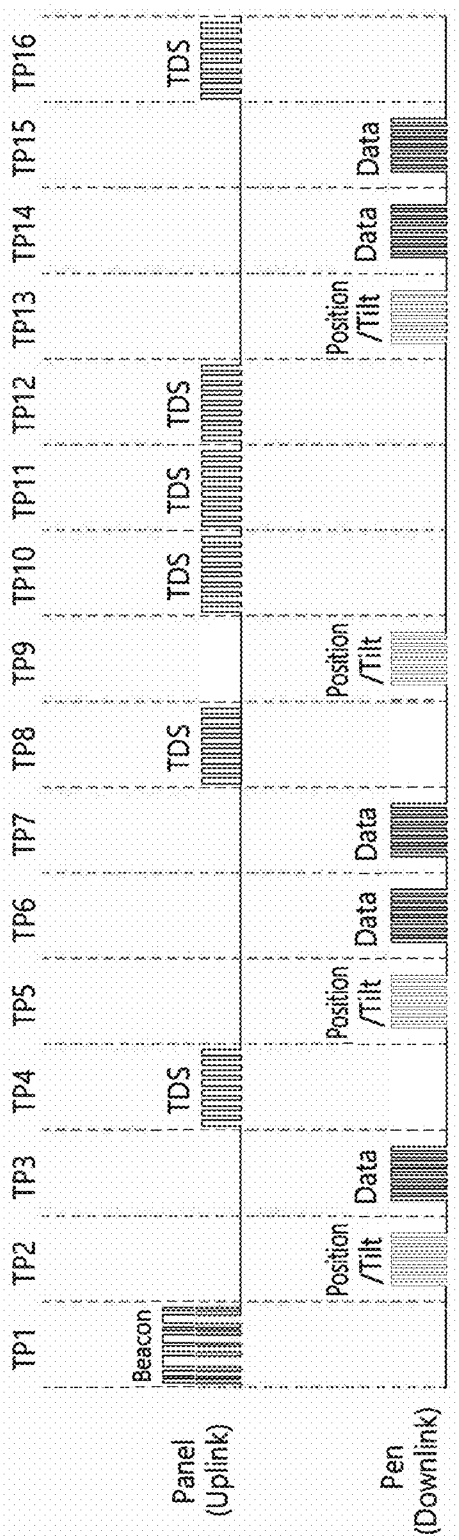
FIG. 6 is an example diagram illustrating the touch drive timing between a touch display device and a stylus according to embodiments of the present disclosure.

FIG. 6 is a diagram illustrating the touch driving timing between a touch display device and a stylus according to embodiments of the present disclosure.

Here, it is illustrated that 16 touch-driving periods TP1 to TP16 are regularly repeated. In this case, the 16 touch-driving periods TP1 to TP16 may be referred to as one touch frame period. In this case, one touch frame period may include a finger touch-driving period during which a finger touch may be sensed.

If the touch-driving operation for the stylus 200 occurs simultaneously with the display-driving operation, the one touch frame period may correspond to one frame period during which the display-driving operation occurs. Alternatively, a plurality of touch frame periods may be included within one frame period.

Also illustrated here are downlink signals output from the stylus 200 and various uplink signals supplied by the touch circuit 150 to the display panel 110, according to timings predetermined by a protocol.

Referring to FIG. 6, during one touch frame period corresponding to 16 touch-driving periods TP1 to TP16, a beacon signal, which is one of the uplink signals, may be transmitted from the display panel 110 to the stylus 200 at least once or twice, and the transmission period of the beacon signal may be one or two or more touch-driving periods (e.g., TP1) predetermined by the protocol in the 16 touch-driving periods TP1 to TP16.

Alternatively, the beacon signal may be transmitted periodically every one touch frame period, or the beacon signal may be transmitted periodically every two or more touch frame periods, or the beacon signal may be transmitted at random touch frame periods based on the occurrence of a predetermined event, or the like.

If the beacon signal is transmitted from the display panel 110 to the stylus 200, the stylus 200 may output a downlink signal in response to the beacon signal at a predetermined touch-driving period (here, TP2, TP3, TP5, TP6, TP7, TP9, TP13, TP14, TP15) according to a predetermined protocol.

The downlink signal output from the stylus 200 may be a downlink signal that allows the touch display device 100 to sense the coordinates (position) and tilt of the stylus 200.

Additionally, the downlink signal output from the stylus 200 may be a downlink signal representing data including various additional information about the stylus 200. The data may include, for example, pressure, ID, button information, battery information, information for error checking and correction, and the like.

The downlink signal output from the stylus 200 may be applied to one or more of a plurality of touch electrodes TE included in the display panel 110.

The sixteen touch-driving periods TP1 to TP16 included in one touch frame period may include one or more touch-driving periods (e.g., TP2, TP5, TP9, TP13) for sensing one or more of coordinates and tilt of the stylus.

In response to these touch-driving periods (e.g., TP2, TP5, TP9, TP13), the stylus 200 may output a downlink signal associated with sensing of one or more of the coordinates and tilt.

In this case, the downlink signal may be a signal consisting of pulses that periodically swing between a high level and a low level.

The sixteen touch-driving periods TP1 to TP16 included in one touch frame period may include one or more touch-driving periods (e.g., TP3, TP6, TP7, TP14, TP15) during which data may be sensed.

In response to these touch-driving periods (e.g., TP3, TP6, TP7, TP14, TP15), the stylus 200 may output a downlink signal associated with data sensing.

In such cases, the downlink signal may be a signal consisting of aperiodic pulses representing additional information contained in the data.

As described above, when the downlink signal is output from the stylus 200 in accordance with the touch-driving periods defined by the protocol, the touch circuit 150 may receive the downlink signal via the display panel 110 and perform sensing processing for the stylus 200 based on the received downlink signal.

Here, the pen sensing processing may include one or more of sensing a coordinate of the stylus 200, sensing a tilt of the stylus 200, and recognizing additional information of pen contained in the data.

On the other hand, the sixteen touch-driving periods TP1 to TP16 included in the one touch frame period may include one or more touch-driving periods (e.g., TP4, TP8, TP10, TP11, TP12, TP16) for sensing a finger touch.

During these one or more touch-driving periods (e.g., TP4, TP8, TP10, TP11, TP12, TP16), the touch circuit 150 may supply a touch-driving signal TDS for sensing a finger touch to all or some of the plurality of touch electrodes TE included in the display panel 110.

Such a touch-driving signal TDS may be a signal that swings between a high level and a low level. That is, the touch-driving signal TDS may be a modulated signal with a variable voltage level.

On the other hand, among the touch-driving periods (e.g., TP1, TP2, TP3, TP5, TP6, TP7, TP9, TP13, TP14, TP15) for sensing the pen touch, for other touch-driving periods (e.g., TP2, TP3, TP5, TP6, TP7, TP9, TP13, TP14, TP15) than the touch-driving period corresponding to the beacon signal transmission period (e.g., TP1), the touch circuit 150 may supply a constant voltage level direct current voltage to the display panel 110.

Here, the direct current voltage may be a low-level voltage, such as a touch-driving signal, a beacon signal, etc., or a high-level voltage, or any voltage between the low-level voltage and the high-level voltage, or a ground voltage.

The touch-driving operation performed during the stylus touch-driving periods (e.g., TP1, TP2, TP3, TP5, TP6, TP7, TP9, TP13, TP14, TP15) for sensing a touch of the stylus 200 may be referred to as a stylus touch-driving operation. In addition, the touch-driving operation performed during a finger touch-driving period (e.g., TP4, TP8, TP10, TP11, TP12, TP16) for sensing a finger touch may be referred to as a finger touch-driving operation.

The touch-driving period TP may include only stylus touch-driving periods, only finger touch-driving periods, or a combination of stylus touch-driving periods and finger touch-driving periods.

In this case, if the uplink signal transmitted from the touch display device 100 to the stylus 200 is included in the display-driving period, a coupling capacitance may be formed on the data line at a location where the data line intersects the touch electrode to which the uplink signal is applied, and a resulting crosstalk induced in the data voltage may lead to a bright line or dark line in the image.

The touch display device 100 of the present disclosure may transmit, during a pen touch-driving period for stylus touch sensing, an uplink signal to a whole area of the display panel in a blank period, and then transmit an uplink signal with a different phase depending on the position of the stylus. On the other hand, during the finger touch-driving period for finger touch sensing, touch-driving signals TDS may be sequentially supplied to the touch electrodes disposed on the display panel 110.

Figure 7:
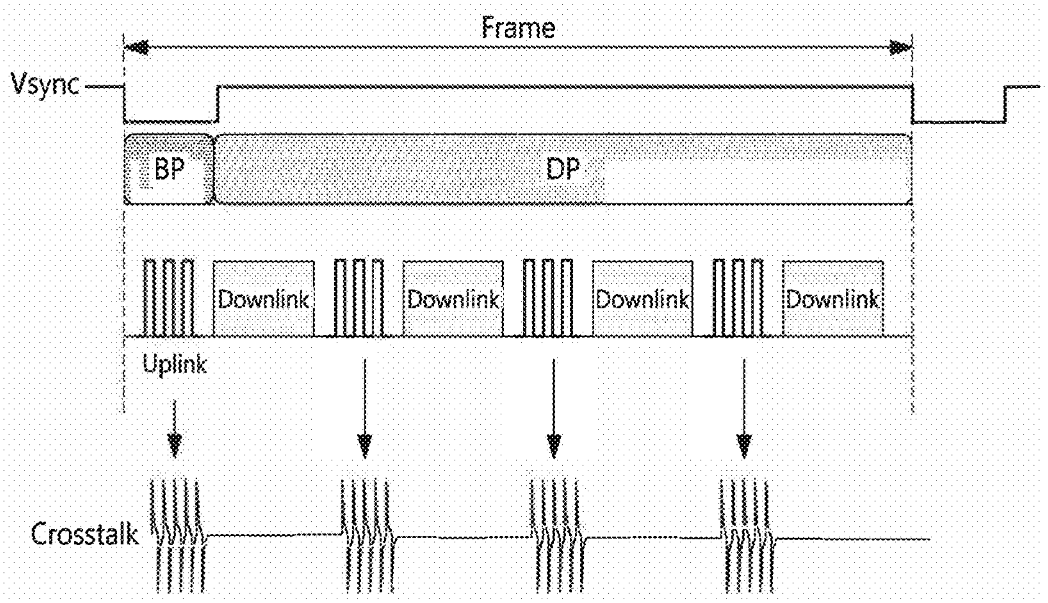
FIGS. 7 and 8 are diagrams illustrating the concept of crosstalk being generated by an uplink signal during the sensing process of a stylus according to embodiments of the present disclosure.
Figure 8:
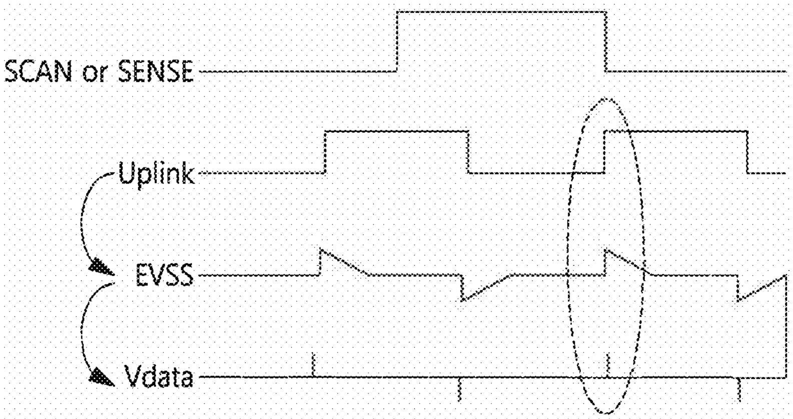
Figure 9:
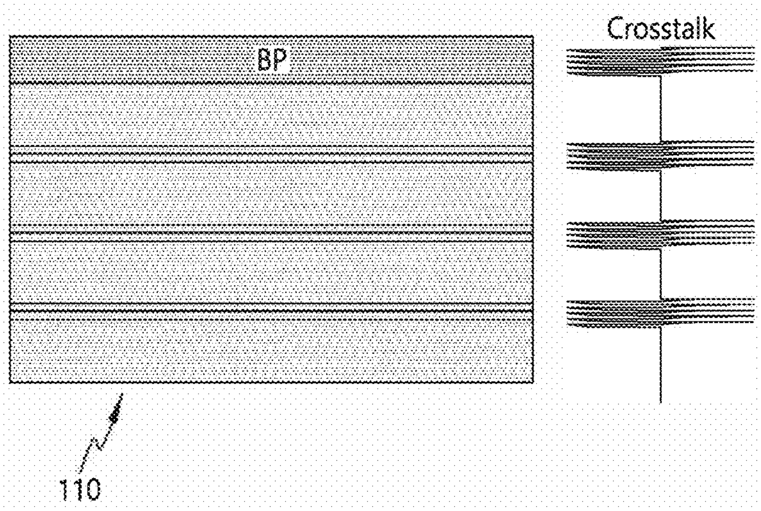
FIG. 9 is a diagram illustrating the case in which a bright or dark line appears on a display panel as a result of crosstalk caused by an uplink signal according to embodiments of the present disclosure.

FIGS. 7 and 8 are diagrams illustrating a concept in which crosstalk is generated by an uplink signal in the sensing process of a stylus, and FIG. 9 is a diagram illustrating an example of a case in which a bright line or a dark line appears on a display panel as a result of crosstalk generated by an uplink signal.

Referring to FIGS. 7 to 9, the stylus touch-driving period for sensing the stylus 200 on the touch display device 100 may be temporally separated from the display-driving period DP for displaying the video image, but may also temporally overlap.

Herein, a description will be made, focusing on the stylus touch-driving period for stylus sensing.

In such a structure, if the stylus touch-driving period overlaps with the display-driving period DP, the uplink signal in the form of a pulse supplied through the touch electrode TE during the display-driving period DP causes ripples to form in the base voltage EVSS flowing across the cathode electrode.

These ripples are most pronounced at transitions when the uplink signal changes from low to high level or from high to low level.

The ripple voltage formed on the cathode electrode causes a crosstalk on the data line DL at a location where the data line intersects with the touch electrode to occur, resulting in the appearance of a bright or dark line at a location corresponding to the uplink signal.

The touch display device 100 of the present disclosure may operate in a global uplink mode in which an uplink signal is transmitted to the entire area of the display panel 110 in a blank period BP, and in a local uplink mode in which an uplink signal with a different phase is transmitted in a display-driving period DP depending on the detected position of the stylus, thereby reducing a crosstalk caused by the uplink signal and improving the image quality of the video image.

Figure 10:
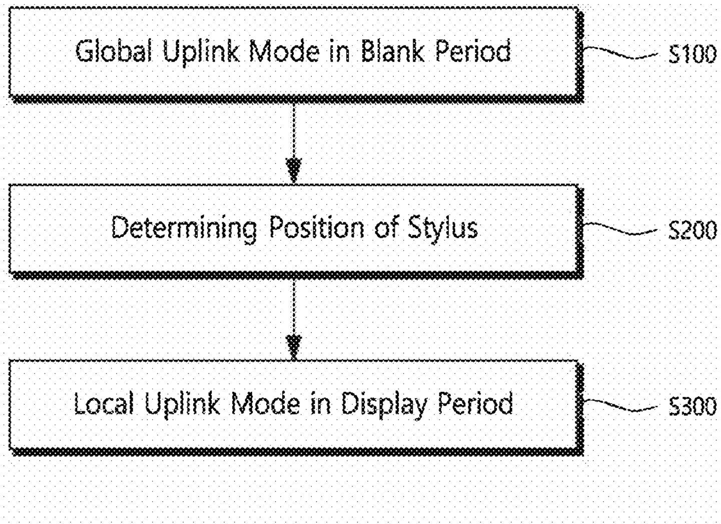
FIG. 10 is a flow diagram illustrating a touch driving method according to embodiments of the present disclosure.

FIG. 10 is a flow diagram illustrating a touch driving method according to embodiments of the present disclosure.

Referring to FIG. 10, the touch driving method according to embodiments of the present disclosure may include a stage S100 of operating in a global uplink mode during a blank period BP, a stage S200 of determining a position of the stylus 200, and a stage S300 of operating in a local uplink mode based on the position of the stylus 200 during a display-driving period DP.

The stage S100 of operating in a global uplink mode during a blank period BP is a process of transmitting an uplink signal to the stylus 200 through the entire area of the display panel 110 during a blank period BP in which no video image is displayed during one frame period.

In the global uplink mode, the uplink signals supplied to the entire area of the display panel 110 during the blank period BP may have the same phase.

The blank period BP is an interval within one frame during which no video image is displayed. Therefore, even if an uplink signal is supplied to the entire area of the display panel 110 during the blank period BP, there is no degradation of the image quality caused due to the uplink signal.

Figure 11:
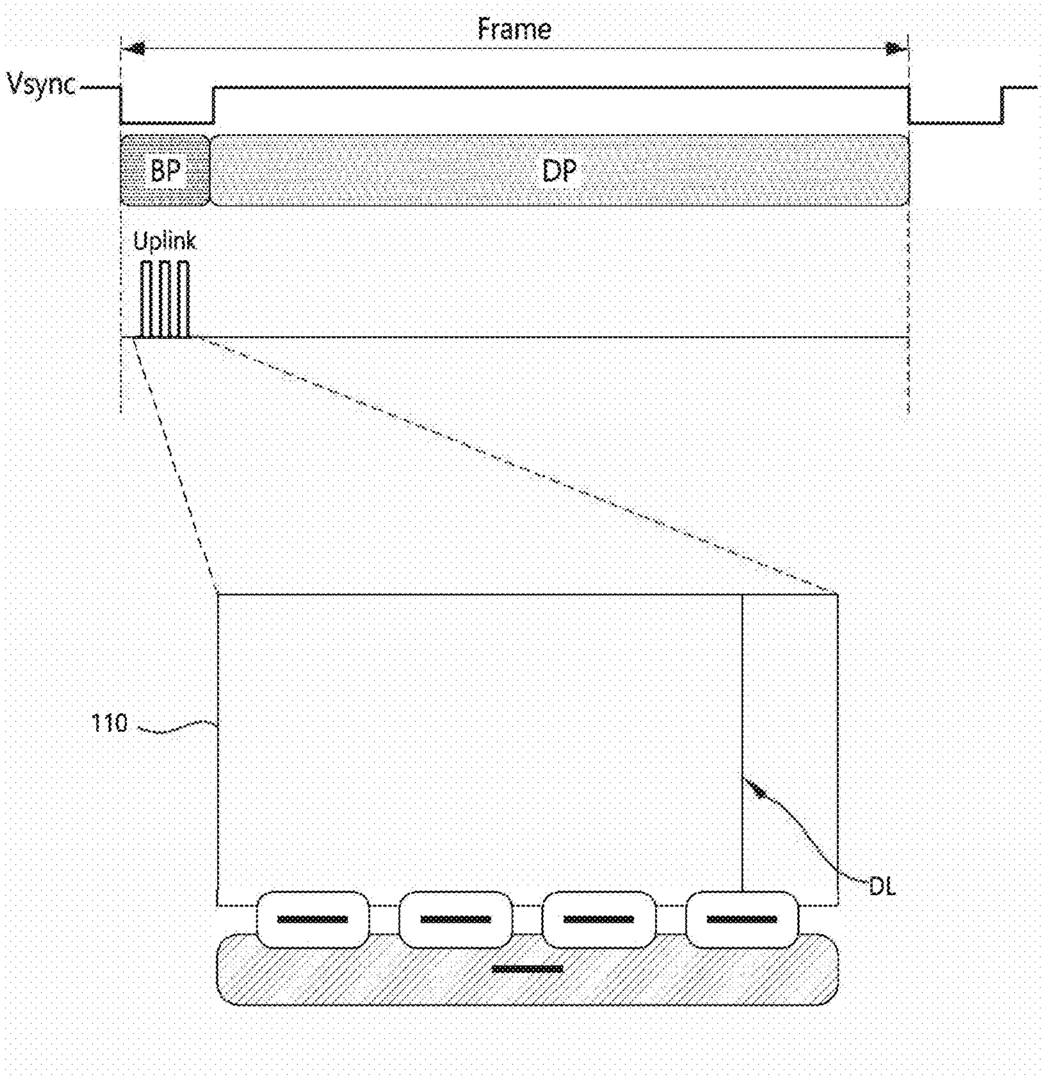
FIG. 11 is a diagram illustrating an operational state of a global uplink mode in the touch driving method according to embodiments of the present disclosure.

FIG. 11 is a diagram illustrating an example operation state of a global uplink mode in a touch driving method according to embodiments of the present disclosure.

Referring to FIG. 11, a touch driving method according to embodiments of the present disclosure may provide an uplink signal in the form of pulses to cover the entire area of the display panel 110 during a blank period BP.

Here, during the blank period BP, no data voltage Vdata is applied through the data line DL, and therefore, no crosstalk is introduced to the data voltage Vdata by the uplink signal supplied during the blank period BP.

As a result, the position of the stylus 200 in proximity to and/or in contact with the display panel 110 may be detected during the blank period BP without any degradation in image quality, such as bright or dark lines.

The stage S200 of determining the position of the stylus 200 is a process of determining the position of the stylus 200 using a downlink signal transmitted from the stylus 200.

In this case, the downlink signal transmitted from the stylus 200 may be transmitted in a blank period BP, or may be transmitted in a display-driving period DP.

The touch circuit 150 may utilize the downlink signal from the stylus 200 to detect a position of the stylus 200 or an approximate area where the stylus 200 is in proximity to and/or in contact with the display panel 110.

The stage S300 of operating in the local uplink mode based on the position of the stylus 200 in the display-driving period DP is a process of supplying a first uplink signal having a first phase to a first local region based on the position of the stylus 200, and a second uplink signal having a second phase to a second local region based on the position of the stylus 200. At the stage S300, during the display-driving period DP, video image is displayed at the display panel 110.

Figure 12:
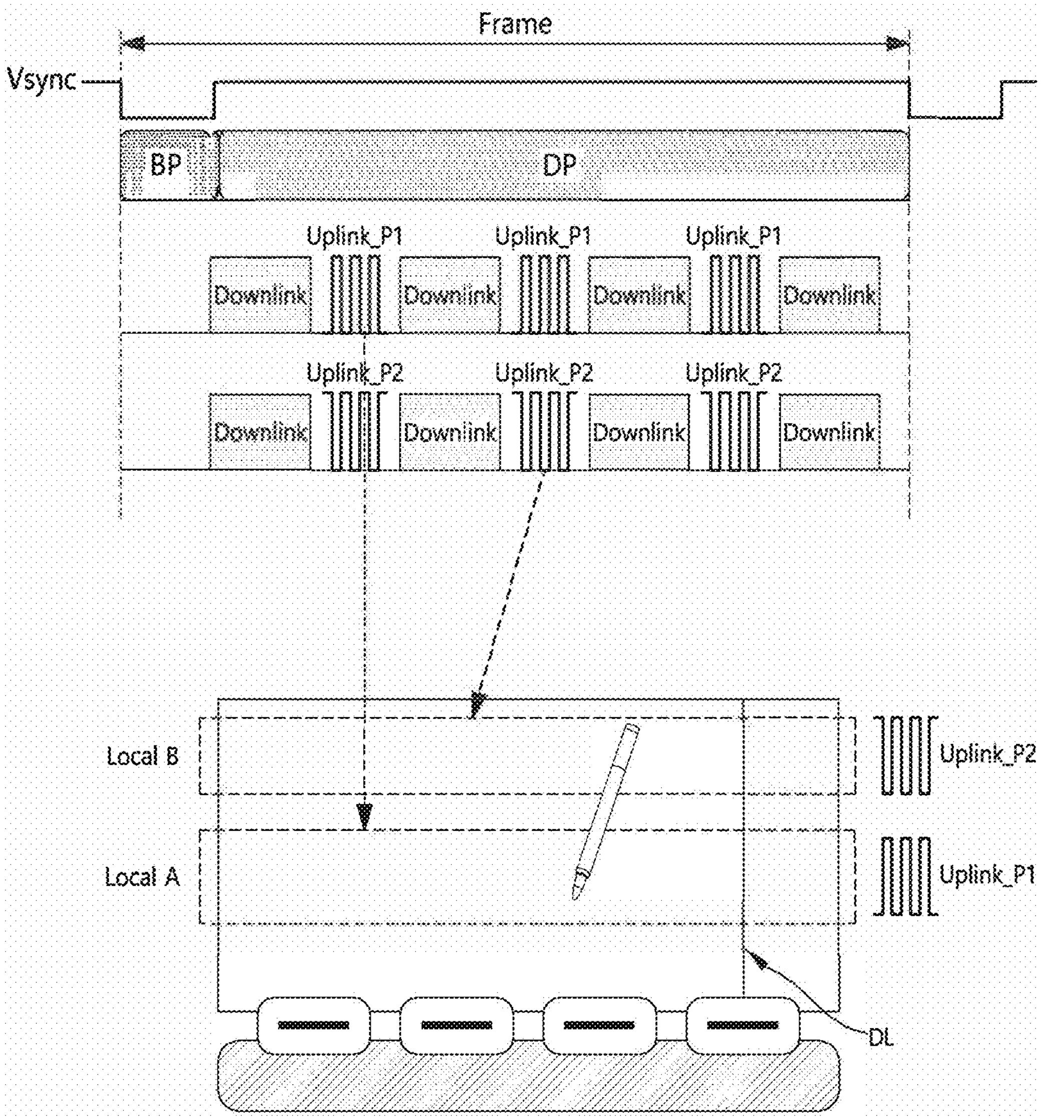
FIG. 12 is a diagram illustrating an operational state of a local uplink mode in the touch driving method according to embodiments of the present disclosure.

FIG. 12 is a diagram illustrating an example operational state of a local uplink mode in a touch driving method according to embodiments of the present disclosure.

Referring to FIG. 12, a touch display device 100 according to embodiments of the present disclosure may operate in the local uplink mode within a display-driving period DP.

In the local uplink mode, the touch circuit 150 may divide the display panel 110 into a first local region Local A and a second local region Local B based on the position of the stylus 200 detected in the global uplink mode.

In the touch display device 100 of the present disclosure, the first local region Local A and the second local region Local B to which uplink signals of different phases are respectively applied may be formed along a direction intersecting with the data line DL so as to reduce a crosstalk due to coupling capacitance formed between the touch electrodes intersecting with the data line DL.

The first local region Local A and the second local region Local B extend along the first touch electrodes to which the uplink signal is applied.

The first touch electrodes extend or are arranged in a direction that intersects with the data lines DLs. For example, the data lines DLs may extend in a second direction (e.g., a column direction) and the first touch electrodes may be arranged or extend in a first direction (e.g., a row direction).

The first local region Local A may include the first touch electrode on which the stylus 200 is detected. The first local region Local A may further include other first touch electrodes adjacent to the first touch electrode on which the stylus 200 is detected.

During the display-driving period DP, the first local region Local A is supplied with a first uplink signal Uplink_P1 having a first phase.

The second local region Local B may include a touch electrode on which the stylus 200 is not positioned.

The second local region Local B may be selected to correspond to a size of the first local region Local A. Further, the second local region Local B may be selected at a location adjacent to the first local region Local A, or may be selected at a location spaced apart from the first local region Local A at a regular interval. The second local region Local B may occupy a remaining area of the display panel 110 that is not occupied by the first local region Local A.

During the display-driving period DP, the second local region Local B is supplied with a second uplink signal Uplink_P2 having a second phase different from the first phase. The second phase may be opposite to the first phase.

In this way, if the first uplink signal Uplink_P1 having the first phase is supplied through the touch electrode of the first local region during the display-driving period DP and the second uplink signal Uplink_P2 having the second phase is supplied through the touch electrode of the second local region during the display-driving period DP, such inverted uplink signals may offset the crosstalk formed on the data line DL orthogonal to the touch electrode to which the uplink signal is applied, thereby preventing image quality degradation such as bright or dark lines.

Figure 13:
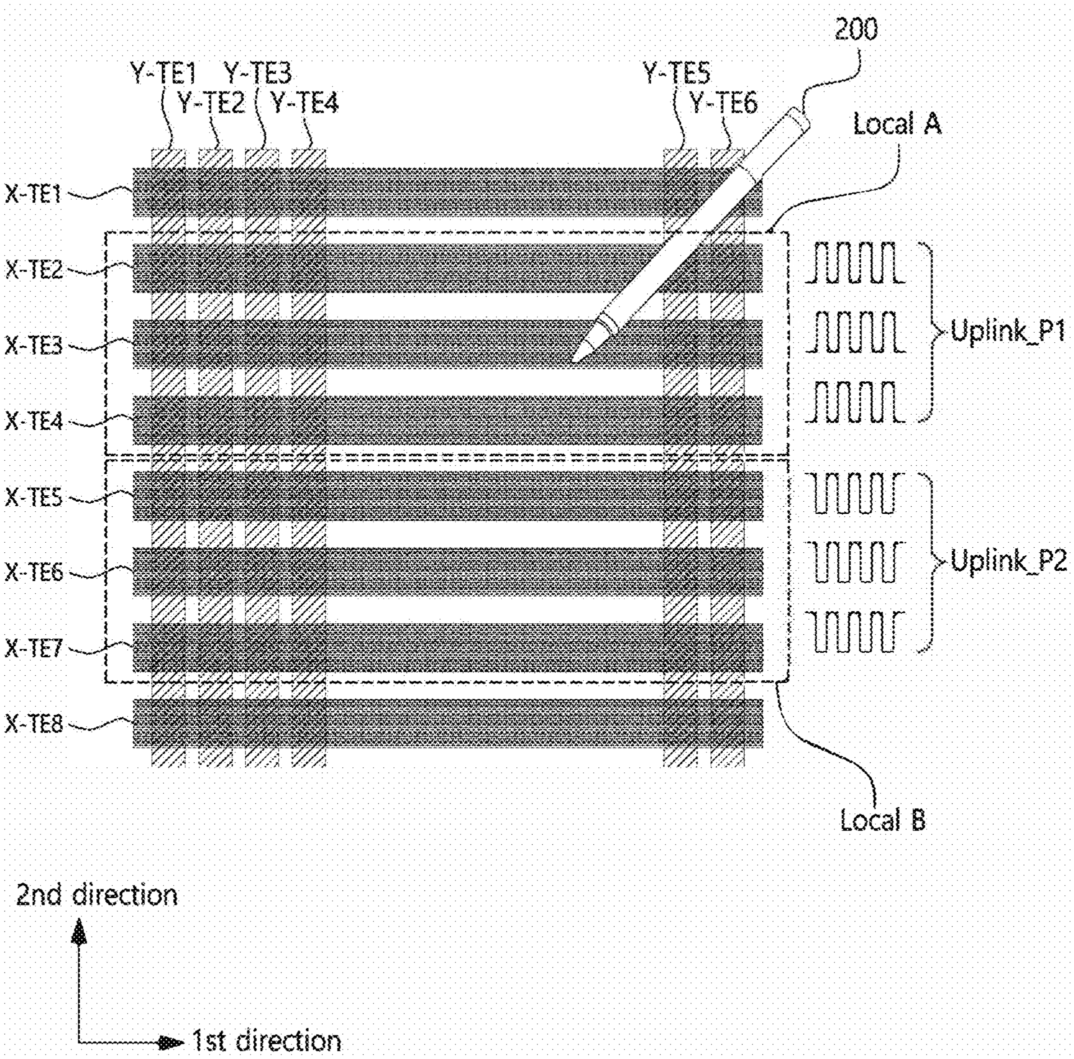
FIG. 13 is a diagram illustrating an example of a first local region and a second local region in the touch driving method according to embodiments of the present disclosure.

FIG. 13 is a diagram illustrating a first local region and a second local region in a touch driving method according to embodiments of the present disclosure.

Referring to FIG. 13, the touch driving method according to embodiments of the present disclosure may detect a position of the stylus 200 based on the global uplink mode in a blank period BP.

In the case of a mutual capacitance-based touch electrode structure, the display panel 110 may be disposed with a plurality of X-touch electrodes X-TE1 to X-TE8 to which a touch-driving signal is applied and a plurality of Y-touch electrodes Y-TE1 to Y-TE6 to which a touch sensing signal is delivered.

For example, if the stylus 200 is detected to be positioned on the third X-touch electrode X-TE3, the first local region Local A may be selected as a region including the third X-touch electrode X-TE3.

This illustrates a case in which the first local region Local A is selected as a region including the second X-touch electrode X-TE2 and the fourth X-touch electrode X-TE4 adjacent to the third X-touch electrode X-TE3 on which the stylus 200 is positioned.

During the display-driving period DP, the first local region Local A may be supplied with a first uplink signal Uplink_P1 having a first phase.

The second local region Local B may be selected to have a size corresponding to the first local region Local A.

If the first local region Local A is selected as a region including three X-touch electrodes X-TE2, X-TE3, and X-TE4, the second local region Local B may also be selected as a region including three X-touch electrodes (e.g., X-TE5, X-TE6, X-TE7).

A more accurate position of the stylus 200 may be detected by the first uplink signal Uplink_P1 supplied to the first local region Local A.

The second local region Local B may be selected at a location adjacent to or spaced apart from the first local region Local A.

During the display-driving period DP, the second local region Local B may be supplied with a second uplink signal Uplink_P2 having a second phase that is different from the first phase. The second phase may be opposite to the first phase.

Figure 14:
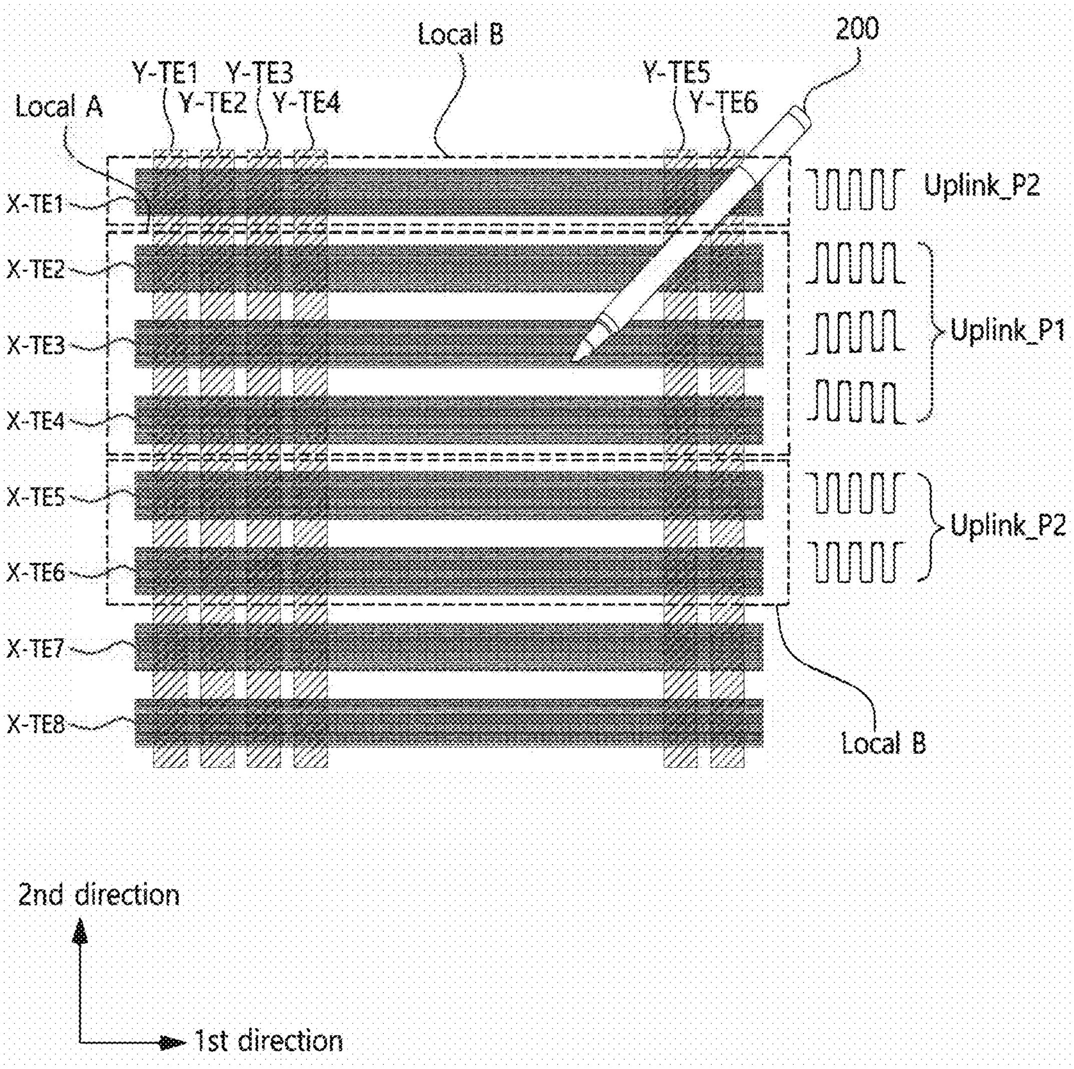
FIG. 14 is a diagram illustrating another example of a first local region and a second local region in the touch driving method according to embodiments of the present disclosure.

FIG. 14 is a diagram illustrating another example of a first local region and a second local region in a touch driving method according to embodiments of the present disclosure.

Referring to FIG. 14, the touch driving method according to embodiments of the present disclosure may detect a position of the stylus 200 based on the global uplink mode in a blank period BP.

For example, if the stylus 200 is detected to be positioned on the third X-touch electrode X-TE3, the first local region Local A may be selected as a region that includes the second X-touch electrode X-TE2 and the fourth X-touch electrode X-TE4 adjacent to the third X-touch electrode X-TE3.

During the display-driving period DP, the first local region Local A may be supplied with a first uplink signal Uplink_P1 having a first phase.

The second local region Local B may be selected to have a size corresponding to the first local region Local A.

If the first local region Local A is selected as a region including three X-touch electrodes X-TE2, X-TE3, and X-TE4, the second local region Local B may also be selected as a region including three X-touch electrodes (e.g., X-TE1, X-TE5, X-TE6).

In this case, the second local region Local B may be selected a portion above the first local region Local A and another portion below the first local region Local A.

For example, a first X-touch electrode X-TE1 may be selected from an upper portion adjacent to the first local region Local A, and a fifth X-touch electrode X-TE5 and a sixth X-touch electrode X-TE6 may be selected from a lower portion adjacent to the first local region Local A to form the second local region Local B.

During the display-driving period DP, the second local region Local B may be supplied with a second uplink signal Uplink_P2 having a second phase that is different from the first phase. The second phase may be opposite to the first phase.

Figure 15:
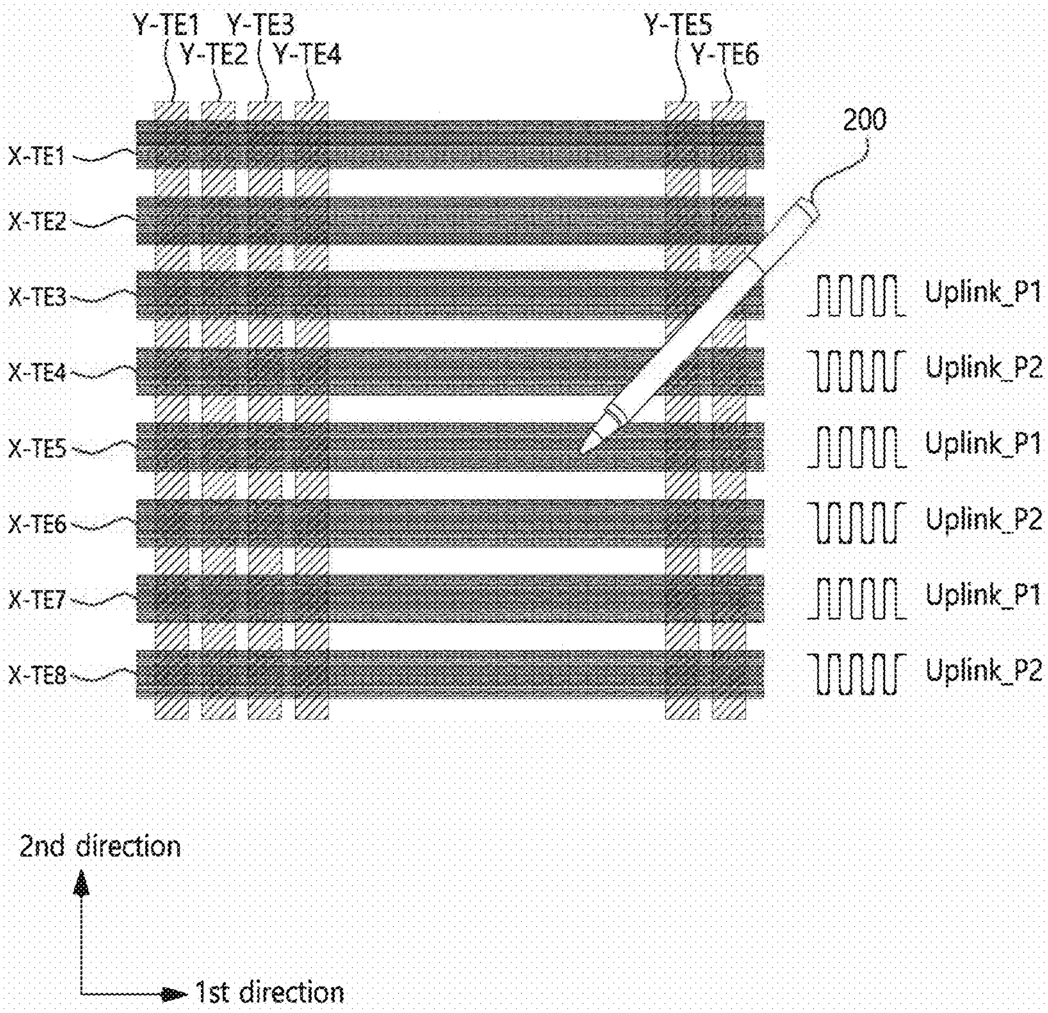
FIG. 15 is a diagram illustrating a further example of a first local region and a second local region in the touch driving method according to embodiments of the present disclosure.

FIG. 15 is a diagram illustrating a still another example of a first local region and a second local region in a touch driving method according to embodiments of the present disclosure.

Referring to FIG. 15, the touch driving method according to embodiments of the present disclosure may detect a position of the stylus 200 based on a global uplink mode in a blank period BP.

At this time, the first local region Local A and the second local region Local B may be alternately selected.

For example, if the stylus 200 is detected to be positioned on the fifth X-touch electrode X-TE5, the fifth X-touch electrode X-TE5 may be selected as the first local region Local A.

Further, the fourth X-touch electrode X-TE4 and the sixth X-touch electrode X-TE6 adjacent to the fifth X-touch electrode X-TE5 may be selected as the second local region Local B.

Furthermore, the third X-touch electrode X-TE3 and the seventh X-touch electrode X-TE7 may be selected as the first local region Local A.

In this way, the first local region Local A and the second local region Local B may be selected to be positioned alternately around the position of the stylus 200.

Also in this case, the first local region Local A and the second local region Local B are preferably selected to have the same size.

During the display-driving period DP, the first local region Local A may be supplied with a first uplink signal Uplink_P1 having a first phase.

Further, during the display-driving period DP, the second local region Local B may be supplied with a second uplink signal Uplink_P2 having a second phase that is different from the first phase. The second phase may be opposite to the first phase.

On the other hand, in addition to the first local region Local A to which the first uplink signal Uplink_P1 having the first phase is applied and the second local region Local B to which the second uplink signal Uplink_P2 having the second phase is applied, the touch driving method of the present disclosure may further include a third local region to which a third uplink signal having a direct current phase is applied.

Figure 16:
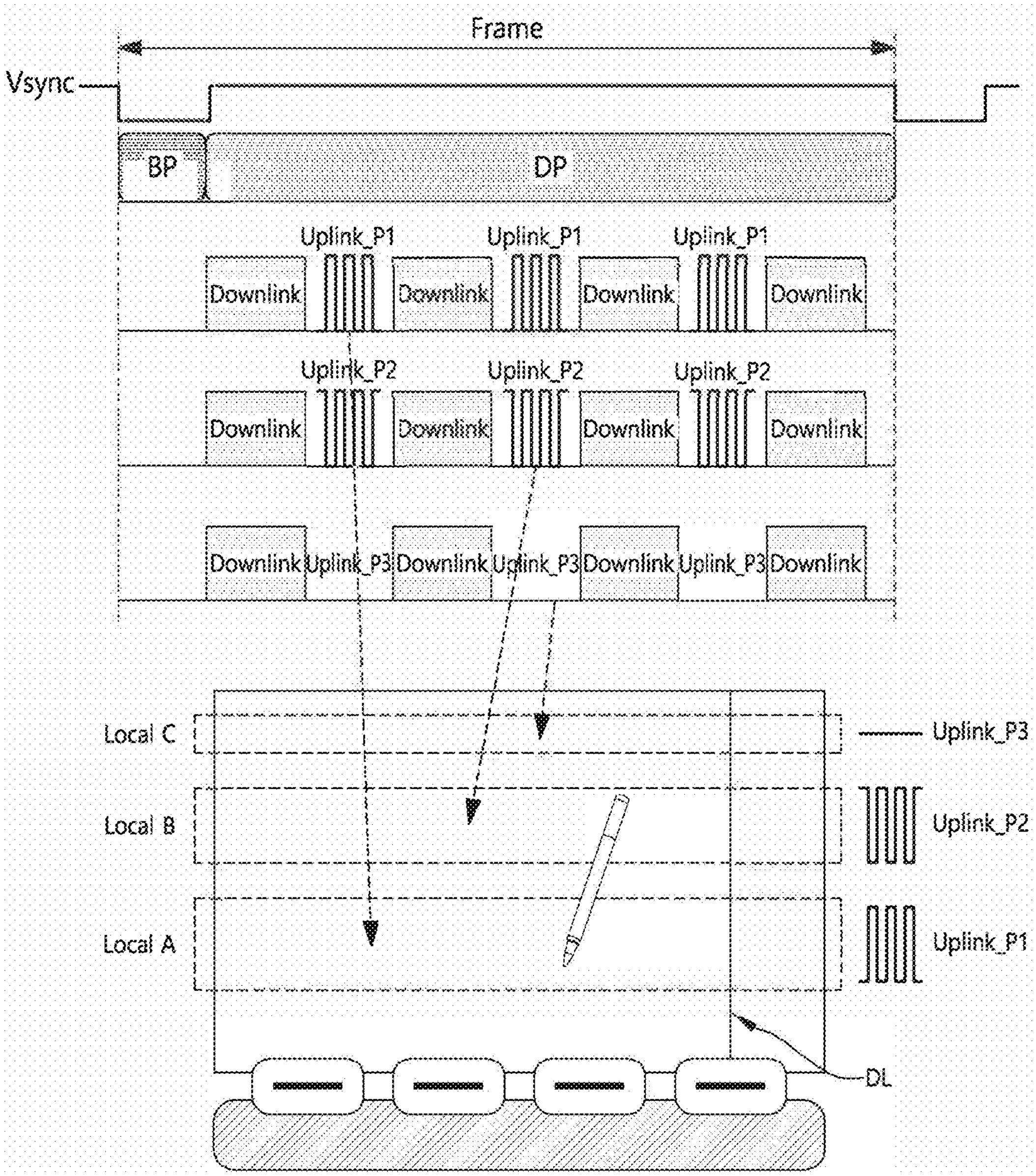
FIG. 16 is a diagram illustrating an operational state of a still another local uplink mode in the touch driving method according to embodiments of the present disclosure.

FIG. 16 is a diagram illustrating an operational state of another local uplink mode in a touch driving method according to embodiments of the present disclosure.

Referring to FIG. 16, a touch display device 100 according to embodiments of the present disclosure may operate in a local uplink mode within a display-driving period DP.

The local uplink mode may divide the display panel 110 into a first local region Local A, a second local region Local B, and a third local region Local C based on a position of a stylus 200 detected in the global uplink mode.

The first local region Local A, the second local region Local B, and the third local region Local C extend along the touch electrode to which the uplink signal is transmitted.

The first local region Local A may be a touch electrode on which the stylus 200 is located, or may include a touch electrode adjacent to the touch electrode on which the stylus 200 is located.

During the display-driving period DP, the first local region Local A is supplied with a first uplink signal Uplink_P1 having a first phase.

The second local region Local B may be selected from a region in which the stylus 200 is not located.

The second local region Local B may be selected to correspond to a size of the first local region Local A. Further, the second local region Local B may be selected at a position adjacent to the first local region Local A, or may be selected at a position spaced apart from the first local region Local A by a certain interval.

During the display-driving period DP, the second local region Local B is supplied with a second uplink signal Uplink_P2 having a second phase that is different from the first phase. The second phase may be opposite to the first phase.

The third local region Local C may be selected from a region that does not correspond to the first local region Local A and the second local region Local B. The third local region Local C may also be selected from a remaining region of the display panel 110 that does not correspond to the first local region Local A and the second local region Local B.

During the display-driving period DP, the third local region Local C may be supplied with a third uplink signal Uplink_P3 having a direct current phase.

As such, during the display-driving period DP, if the first uplink signal Uplink_P1 with the first phase is supplied via the touch electrode in the first local region Local A, and the second uplink signal Uplink_P2 with the second phase is supplied via the touch electrode in the second local region Local B, and the third uplink signal Uplink_P3 having the direct current phase is supplied via the touch electrode in the third local region Local C, a crosstalk formed on the data line orthogonal to the touch electrode to which the uplink signal is applied may be offset, thereby preventing image quality degradation such as bright or dark lines.

Figure 17:
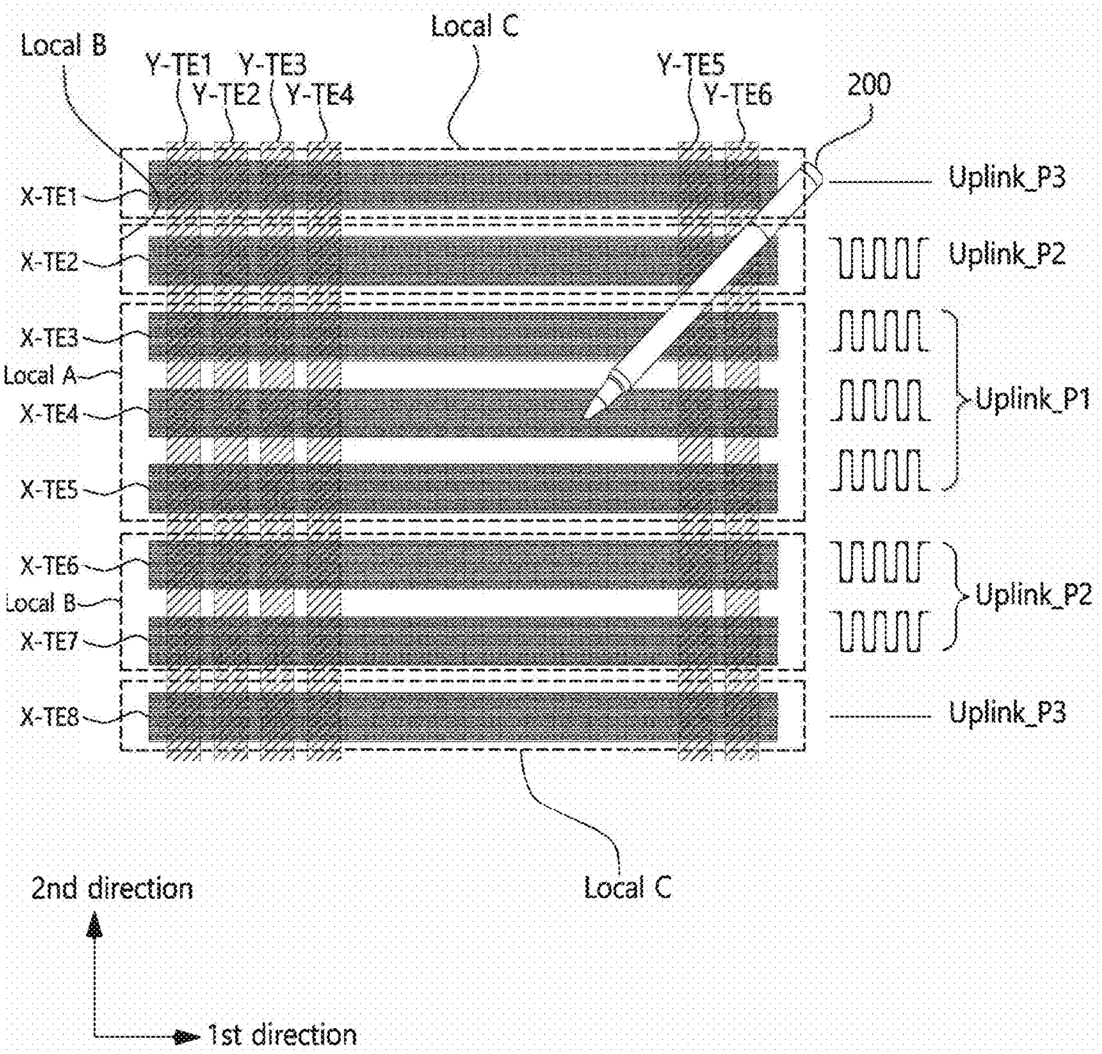
FIG. 17 is a diagram illustrating an example of a first local region, a second local region, and a third local region in the touch driving method according to embodiments of the present disclosure.

FIG. 17 is a diagram illustrating a first local region, a second local region, and a third local region in a touch driving method according to embodiments of the present disclosure.

Referring to FIG. 17, the touch driving method according to embodiments of the present disclosure may detect a position of a stylus 200 based on a global uplink mode in a blank period BP.

For example, if the stylus 200 is detected to be positioned on the fourth X-touch electrode X-TE4, the first local region Local A may be selected as a region that includes the third X-touch electrode X-TE3 and the fifth X-touch electrode X-TE5 adjacent to the fourth X-touch electrode X-TE4.

During the display-driving period DP, the first local region Local A may be supplied with a first uplink signal Uplink_P1 having a first phase.

The second local region Local B may be selected to have a size corresponding to the first local region Local A.

If the first local region Local A is selected as a region including three X-touch electrodes X-TE3, X-TE4, and X-TE5, the second local region Local B may also be selected as a region including three X-touch electrodes (e.g., X-TE2, X-TE6, X-TE7).

In this case, the second local region Local B may be selected a portion above the first local region Local A and another portion below the first local region Local A.

For example, a second X-touch electrode X-TE2 may be selected from an upper portion adjacent to the first local region Local A, and a sixth X-touch electrode X-TE6 and a seventh X-touch electrode X-TE7 may be selected from a lower portion adjacent to the first local region Local A to form the second local region Local B.

During the display-driving period DP, the second local region Local B may be supplied with a second uplink signal Uplink_P2 having a second phase that is different from the first phase. The second phase may be opposite to the first phase.

The third local region Local C may be selected as a region other than the first local region Local A and the second local region Local B.

For example, the third local region Local C may be selected as the first X-touch electrode X-TE1 and the eighth X-touch electrode X-TE8.

Alternatively, the third local region Local C may be located between the first local region Local A and the second local region Local B.

During the display-driving period DP, the third local region Local C may be supplied with a third uplink signal Uplink_P3 having a direct current phase.

Figure 18A:
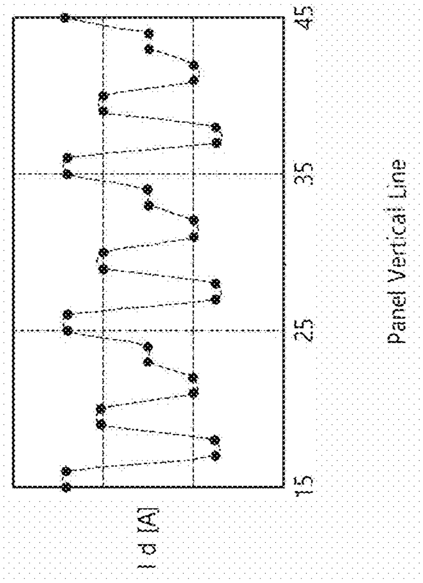
FIGS. 18A and 18B are diagrams illustrating a change in drive current by the touch driving method according to embodiments of the present disclosure, compared to a conventional method.
Figure 18B:
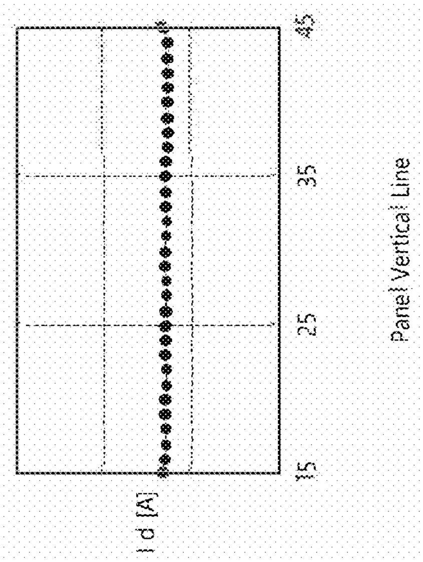
Figure 19A:
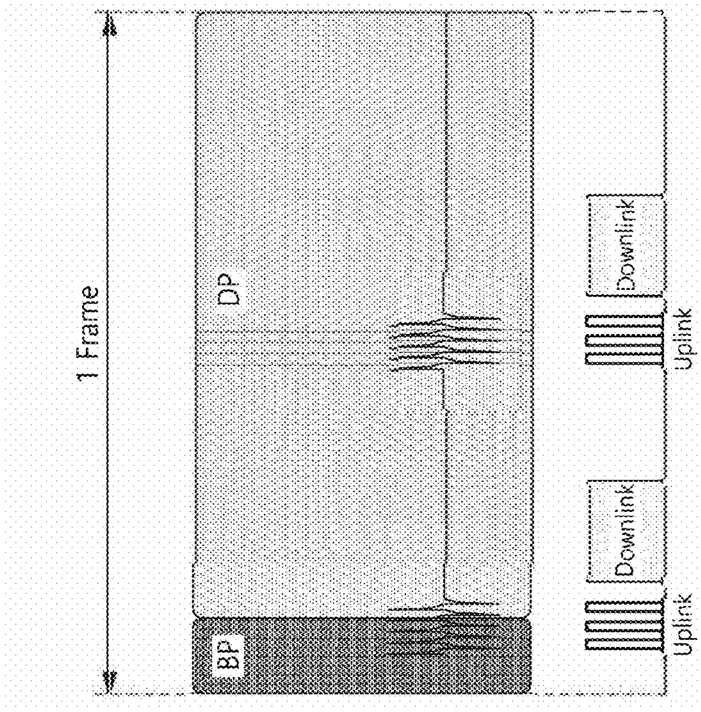
FIGS. 19A and 19B are diagrams illustrating a crosstalk by the touch driving method according to embodiments of the present disclosure, compared to a conventional method.
Figure 19B:
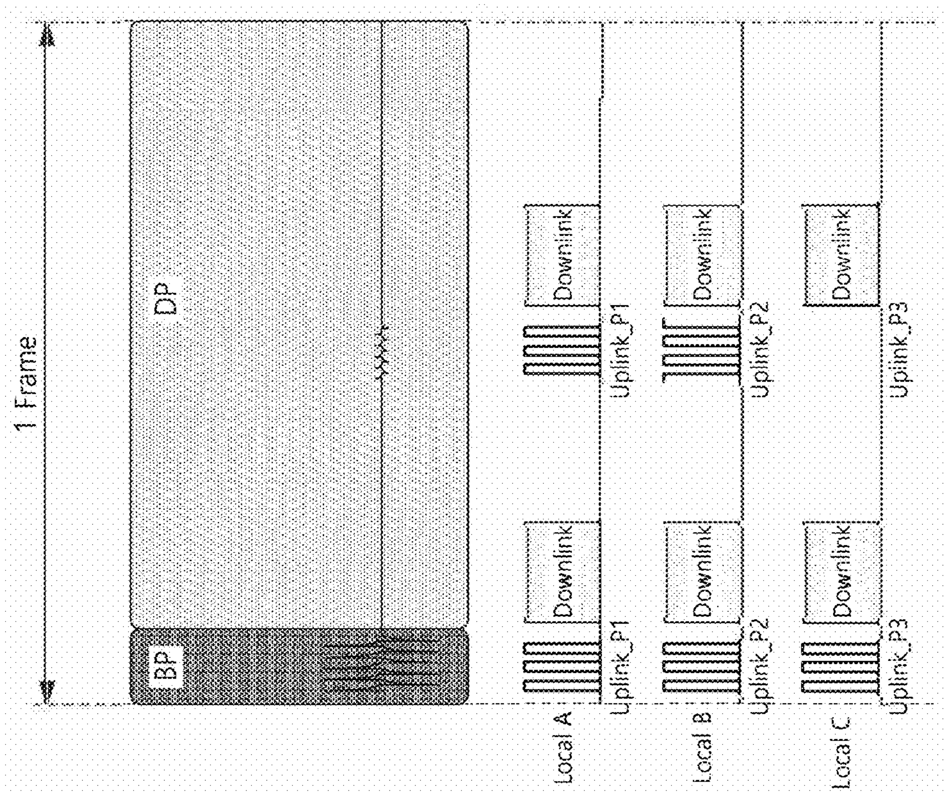

FIGS. 18A and 18B are diagrams illustrating a change in drive current by the touch driving method according to embodiments of the present disclosure, compared to a conventional method. FIGS. 19A and 19B are diagrams illustrating a crosstalk by the touch driving method according to embodiments of the present disclosure compared to a conventional method.

Referring to FIG. 18A, if an uplink signal having the same phase is applied to the entire area of the display panel 110 during the display-driving period DP, a deviation in a drive current Id flowing through a light-emitting diode greatly increases along a vertical line along which data line DL is arranged.

In contrast, referring to FIG. 18B, as in embodiments of the present disclosure, during a display-driving period DP, if a first uplink signal Uplink_P1 having a first phase is supplied via a touch electrode in a first local region, and a second uplink signal Uplink_P2 having a second phase is supplied via a touch electrode in a second local region, and a third uplink signal Uplink_P3 having a direct current phase is supplied via a touch electrode in a third local region, it may be seen that a deviation in a drive current Id flowing through a light-emitting diode is reduced because a crosstalk formed on the data line at a position where the data line intersects with the touch electrode to which the uplink signal is applied may be offset.

Furthermore, referring to FIG. 19A, if an uplink signal having the same phase is applied to the entire area of the display panel 110 during the display-driving period DP, a bright or dark line may appear on the display panel 110 due to a crosstalk formed on the data line at a position where the data line intersects with the touch electrode to which the uplink signal is applied.

In contrast, referring to FIG. 19B, as in embodiments of the present disclosure, during a display-driving period DP, if a first uplink signal Uplink_P1 having a first phase is supplied via a touch electrode in a first local region, and a second uplink signal Uplink_P2 having a second phase is supplied via a touch electrode in a second local region, and a third uplink signal Uplink_P3 having a direct current phase is supplied via a touch electrode in a third local region, a crosstalk formed on the data line at a position where the data line intersects with the touch electrode to which the uplink signal is applied may be offset, thereby reducing the generation of bright or dark lines on the display panel 110.

The touch display device 100 of the present disclosure may also be applied to a self-capacitance type touch electrode structure. FIG. 2 is a diagram illustrating a schematic configuration of a mutual capacitance-based touch electrode structure in a touch display device according to embodiments of the present disclosure.

Figure 20:
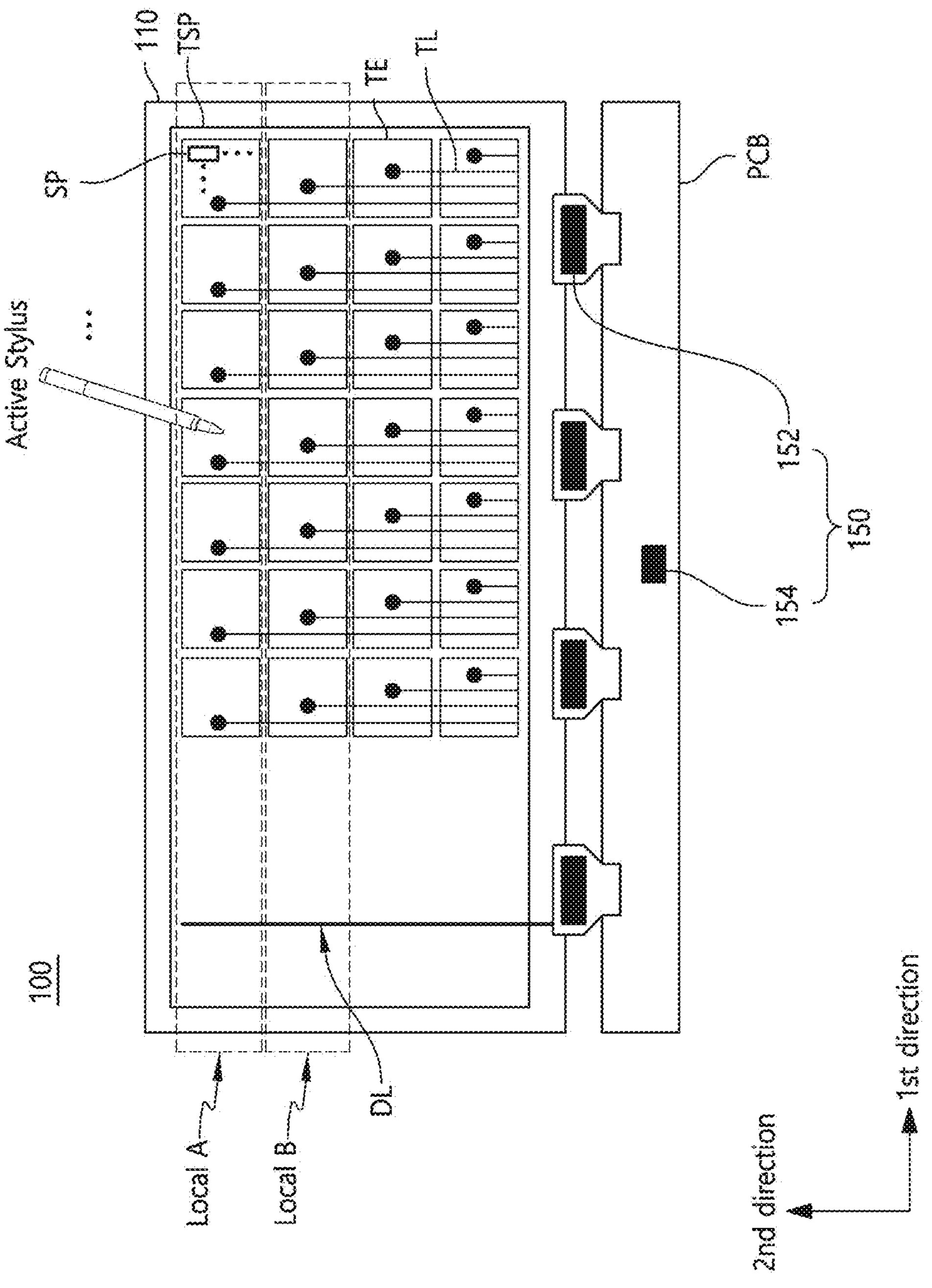
FIG. 20 is a diagram schematically illustrating a self-capacitance-based touch electrode structure in a touch display device according to embodiments of the present disclosure.

FIG. 20 is a diagram illustrating a self-capacitance-based touch electrode structure in a touch display device according to embodiments of the present disclosure.

Referring to FIG. 20, the touch display device 100 according to embodiments of the present disclosure may be a display device, including a television (TV), a monitor, a mobile device such as a tablet, or smartphone, or the like, in which a touch screen panel TSP including a plurality of touch electrodes TE as touch sensors is embedded in a display panel 110.

For example, the touch display device 100 may block a common electrode into a plurality of sub-blocks and may use the sub-blocks as touch electrodes TE. The plurality of touch electrodes TE may be arranged in a matrix form on the display panel 110.

The display panel 110 may be any type of panel, such as a liquid crystal display panel, an organic light-emitting display panel, or the like.

In an example, if the display panel 110 is a liquid crystal display panel, the touch display device 100 may block a common electrode that forms an electric field with pixel electrodes when a common voltage is applied, into a plurality of common electrode blocks and may utilize the blocks as a plurality of touch electrodes TE.

In another example, if the display panel 110 is an organic light-emitting display panel, the touch display device 100 may include an organic light-emitting diode including a first electrode, an organic light-emitting layer, a second electrode, an encapsulation layer located on the second electrode and having a sealing function, and a touch sensor metal layer located on the encapsulation layer, wherein a plurality of touch electrodes TE may be formed on the touch sensor metal layer.

The touch display device 100 may include a touch circuit 150 that drives the display panel 110 with the touch screen panel TSP embedded therein to perform touch sensing and stylus sensing using signals received via the display panel 110.

Such a touch circuit 150 may include a touch drive circuit 152 that drives the display panel 110 to receive signals via the display panel 110, and a touch controller 154 that utilizes the signals received via the display panel 110 to perform passive touch sensing (finger touch sensing) and active touch sensing.

The touch drive circuit 152 may be implemented as an integrated drive circuit with a data drive circuit driving the data lines DLs.

The touch drive circuit 152 may be a type of a chip on film (COF).

The film on which the touch drive circuit 152 is mounted may be bonded to each of a bonding portion of the display panel 110 and a bonding portion of a printed circuit board (PCB).

The PCB may be mounted with a touch controller 154 or the like.

The touch drive circuit 152 and the data drive circuit may be implemented as separate drive chips. The touch drive circuit 152 may be electrically connected via a plurality of touch electrodes TE and a plurality of touch lines TL that form the display panel 110.

The touch display device 100 of the present disclosure may select a first local region Local A and a second local region Local B, to which uplink signals having different phases are applied, along a direction in which the local regions intersect with the data line DL so as to reduce a crosstalk caused due to coupling capacitance formed between touch electrodes TE intersecting with the data line DL.

The first local region Local A and the second local region Local B extend along the touch electrodes TE to which the uplink signals are applied, and may be selected in a direction in which the local regions intersect with the data line DL. For example, the data lines DLs may extend in a second direction (e.g., a column direction), and the first local region Local A and the second local region Local B may be selected along the first direction (e.g., a row direction).

For example, in a blank period, if the global uplink mode determines that the stylus is positioned in a first row, the region where a first row of touch electrodes arranged in a first direction (row direction) is located may be selected as a first local region Local A, and the region where a second row of touch electrodes adjacent to the first local region Local A is located may be selected as a second local region Local B.

Then, a local uplink mode is performed in which a plurality of local uplink signals having different phases are supplied to a first local region Local A and a second local region Local B during a display-driving period.

The embodiments of the present disclosure described above will be briefly described below.

A touch display device according to embodiments of the present disclosure includes a display panel having a plurality of touch electrodes, a drive circuit configured to drive the display panel, a touch circuit configured to detect a position of a stylus using a downlink signal transmitted from the stylus, and a timing controller configured to control the drive circuit and the touch circuit, wherein the touch circuit operates in a global uplink mode supplying a global uplink signal to the entirety of the display panel during a blank period, and operates in a local uplink mode supplying a plurality of local uplink signals having different phases to a plurality of regions during a display-driving period.

The plurality of touch electrodes may include a set of first touch electrodes extending in a first direction and arranged in a second direction intersecting the first direction, and a set of second touch electrodes extending in the second direction and arranged in the first direction, wherein the touch circuit supplies the global uplink signal to the entirety of the first touch electrodes in the global uplink mode, and wherein the touch circuit supplies the plurality of local uplink signals having to the first touch electrodes corresponding to the plurality of regions, respectively, in the local uplink mode.

The global uplink signal may be supplied to the entirety of the first touch electrodes with the same phase.

The first touch electrodes may extend in a direction orthogonal to a data line.

The touch circuit may detect a first local region corresponding to the position of the stylus based on the downlink signal transmitted from the stylus in the global uplink mode.

The display-driving period may overlap with a touch-driving period detecting a touch of the stylus.

In the local uplink mode, a first local uplink signal having a first phase may be applied to a first local region including the position of the stylus, and a second local uplink signal having a second phase may be applied to a second local region different from the first local region.

The second phase may be opposite to the first phase.

The first local region and the second local region may extend along a touch drive electrode in a mutual capacitance-based touch electrode structure.

The second local region may be located on one or both sides of the first local region.

The first local region and the second local region may have the same size.

The first local region and the second local region may be alternately positioned relative to the position of the stylus.

In the local uplink mode, a third local uplink signal having a third phase may be applied to a third local region other than the first local region and the second local region.

The third phase may be a direct current phase.

The third local region may be located outside of the first local region or the second local region.

The plurality of touch electrodes may include touch electrodes arranged in a matrix form along the first direction and a second direction intersecting the first direction, wherein the touch circuit may supply the global uplink signal to the entirety of the touch electrodes in the global uplink mode, and the touch circuit may supply a plurality of local uplink signals to first touch electrodes extending in a direction intersecting a data line in the local uplink mode.

The global uplink signal and the local uplink signal may include a beacon signal or a ping signal.

A touch driving method to detect a position of a stylus in a touch circuit according to embodiments of the present disclosure may include operating in a global uplink mode supplying a global uplink signal to the entirety of a display panel during a blank period, determining the position of the stylus, using a downlink signal transmitted from the stylus, and operating in a local uplink mode supplying a plurality of local uplink signals having different phases to a plurality of regions during a display-driving period.

In the global uplink mode, the global uplink signal may be applied to the entirety of first touch electrodes extending in a first direction intersecting a data line and arranged in a second direction intersecting the first direction.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

What is claimed is:

1. A touch display device, comprising:
- a display panel having a plurality of touch electrodes;
- a drive circuit configured to drive the display panel;
- a touch circuit configured to:
  - detect a position of a stylus relative to the display panel using a downlink signal transmitted from the stylus,
  - supply, during a blank period while operating in a global uplink mode, a global uplink signal to an entirety of the display panel, and
  - supply, during a display-driving period while operating in a local uplink mode, a plurality of local uplink signals having different phases to a plurality of regions of the display panel,
  - wherein, during the display-driving period, an image is displayed at the display panel; and
- a timing controller configured to control the drive circuit and the touch circuit.

2. The touch display device of claim 1, wherein the plurality of touch electrodes comprise:
- a set of first touch electrodes extending in a first direction and arranged in a second direction intersecting the first direction; and
- a set of second touch electrodes extending in the second direction and arranged in the first direction,
- wherein the touch circuit is further configured to:
  - supply, while operating in the global uplink mode, the global uplink signal to all first touch electrodes from the set of first touch electrodes, and
  - supply, while operating in the local uplink mode, each of the plurality of local uplink signals to a respective subset of first touch electrodes from the set of first touch electrodes, the respective subset of first touch electrodes corresponding to a respective region of the plurality of regions.

3. The touch display device of claim 2, wherein the touch circuit is further configured to:
- supply the global uplink signal of a single phase to all first touch electrodes from the set of first touch electrodes.

4. The touch display device of claim 3, wherein the set of first touch electrodes extends in a direction that is orthogonal to a data line that is driven by the drive circuit.

5. The touch display device of claim 1, wherein the touch circuit is further configured to:
- while operating in the global uplink mode, detect a first local region of the display panel that corresponds to the position of the stylus based on the downlink signal transmitted from the stylus.

6. The touch display device of claim 1, wherein the display-driving period overlaps with a touch-driving period during which the touch circuit detects a touch of the stylus at the display panel.

7. The touch display device of claim 1, wherein the touch circuit is further configured to:
- while operating in the local uplink mode, supply a first local uplink signal having a first phase to a first local region of the display panel that includes the position of the stylus; and supply a second local uplink signal having a second phase to a second local region of the display panel that is different from the first local region.

8. The touch display device of claim 7, wherein the second phase is opposite to the first phase.

9. The touch display device of claim 7, wherein the first local region and the second local region extend along a touch drive electrode of the plurality of touch electrodes in a mutual capacitance-based touch electrode structure of the display panel.

10. The touch display device of claim 7, wherein the second local region is located adjacent to one side of the first local region or adjacent to both sides of the first local region.

11. The touch display device of claim 7, wherein the first local region and the second local region have a same size.

12. The touch display device of claim 7, wherein the first local region and the second local region are alternately positioned relative to the position of the stylus.

13. The touch display device of claim 7, wherein the touch circuit is further configured to:
- while operating in the local uplink mode, supply a third local uplink signal having a third phase to a third local region of the display panel, the third local region different from the first local region and the second local region.

14. The touch display device of claim 13, wherein the third phase is a direct current phase.

15. The touch display device of claim 13, wherein the third local region is located outside of the first local region or outside of the second local region.

16. The touch display device of claim 1, wherein:

the plurality of touch electrodes comprises touch electrodes arranged in a matrix form along a first direction and a second direction intersecting the first direction;

the display panel further comprises a data line extending along the second direction, the data line driven by the drive circuit;

the touch circuit is further configured to:

while operating in the global uplink mode, supply the global uplink signal to all touch electrodes from the plurality of touch electrodes, and while operating in the local uplink mode, supply a first local uplink signal to first touch electrodes from the plurality of touch electrodes, the first touch electrodes included in a first local region of the display panel, and supply a second local uplink signal to second touch electrodes from the plurality of touch electrodes that are included in a second local region of the display panel;

the first local region and the second local region are mutually adjacent with respect to the second direction; and the second local uplink signal is a signal generated by inverting the first local uplink signal.

17. The touch display device of claim 16, wherein the global uplink signal, the first local uplink signal, or the second local uplink signal comprise a beacon signal or a ping signal.

18. A method of driving a touch display device to detect a position of a stylus relative to a display panel of the touch display device, the method comprising:

supplying, by a touch circuit of the touch display device during a blank period while the touch circuit operates in a global uplink mode, a global uplink signal to an entirety of the display panel;

determining, by the touch circuit, the position of the stylus using a downlink signal transmitted from the stylus in response to the global uplink signal; and supplying, by the touch circuit during a display-driving period while the touch circuit operates in a local uplink mode, a plurality of local uplink signals having different phases to a plurality of regions of the display panel, wherein, during the display-driving period, an image is displayed at the display panel.

19. A touch display device, comprising:

a display panel having a plurality of touch electrodes;

a drive circuit configured to drive the display panel;

a touch circuit configured to:

supply, during a blank period, a global uplink signal to an entirety of the display panel, sense a presence of a touch object based on a downlink signal transmitted from the touch object in response to the global uplink signal, and supply, during a display-driving period, a first local uplink signal having a first phase to a first region of the display panel at which the presence of the touch object is sensed, and a second local uplink signal to a second region of the display panel while the first local uplink signal is supplied to the first region, the second local uplink signal having a second phase that is different from the first phase, wherein, during the display-driving period, an image is displayed at the display panel; and a timing controller configured to control the drive circuit and the touch circuit.

20. The touch display device of claim 19, wherein the touch circuit is further configured to:

supply, during the blank period, the global uplink signal to the plurality of touch electrodes;

supply, during the display-driving period, the first local uplink signal to a first portion of touch electrodes from the plurality of touch electrodes, the first portion of touch electrodes corresponding to the first region of the display panel; and supply, during the display-driving period, the second local uplink signal to a second portion of touch electrodes from the plurality of touch electrodes, the second portion of touch electrodes corresponding to the second region of the display panel.

* * * * *